(12) United States Patent
Torre

(10) Patent No.: US 12,542,998 B1
(45) Date of Patent: Feb. 3, 2026

(54) AUDIO-BASED SITUATION AWARENESS USING ANALOG PROCESSING FRONT-END FOR VEHICLES

(71) Applicant: Besser Systems and Software LLC, Grosse Pointe Shores, MI (US)

(72) Inventor: Anthony J. Torre, Grosse Pointe Shores, MI (US)

(73) Assignee: BESSER SYSTEMS AND SOFTWARE LLC, Grosse Pointe Shores, MI (US)

( * ) Notice: Subject to any disclaimer, the term of this patent is extended or adjusted under 35 U.S.C. 154(b) by 189 days.

(21) Appl. No.: 18/536,094

(22) Filed: Dec. 11, 2023

(51) Int. Cl.
| | |
|---|---|
| *H04R 3/00* | (2006.01) |
| *G01H 3/06* | (2006.01) |
| *G01H 3/12* | (2006.01) |
| *H04R 1/40* | (2006.01) |
| *B60Q 5/00* | (2006.01) |
| *B60Q 9/00* | (2006.01) |
| *G01S 3/808* | (2006.01) |

(52) U.S. Cl.
CPC ............. *H04R 3/005* (2013.01); *G01H 3/06* (2013.01); *G01H 3/12* (2013.01); *H04R 1/406* (2013.01); *B60Q 5/00* (2013.01); *B60Q 9/00* (2013.01); *G01S 3/8083* (2013.01); *H04R 2499/13* (2013.01)

(58) Field of Classification Search
CPC ........ H04R 3/005; H04R 1/326; H04R 1/406; H04R 2499/13; H04R 2430/21; H04R 2430/23; H04R 29/005; H04R 2201/401; H04R 2201/403; H04R 2201/405; G01H 3/06; G01H 3/12; B60Q 5/00; B60Q 9/00; G01S 3/8083

USPC ........................ 381/56, 58, 86, 91, 122, 124
See application file for complete search history.

(56) References Cited

U.S. PATENT DOCUMENTS

| | | | | |
|---|---|---|---|---|
| 2005/0031130 | A1* | 2/2005 | Devantier | H04S 7/301 381/18 |
| 2009/0322559 | A1* | 12/2009 | Yen | G08G 1/0965 340/901 |
| 2013/0251168 | A1* | 9/2013 | Takazawa | H04S 7/30 381/86 |
| 2013/0271307 | A1* | 10/2013 | Kropfitsch | H03G 3/002 341/158 |
| 2019/0172478 | A1* | 6/2019 | Moore | G01S 3/8083 |

* cited by examiner

*Primary Examiner* — William A Jerez Lora
(74) *Attorney, Agent, or Firm* — Robert M. Miller, PLLC

(57) ABSTRACT

An apparatus includes at least three audio sensors, at least three analog processing modules, and a processor circuit. The at least three audio sensors may be configured to generate electronic signals in response to audio sounds in an environment surrounding a vehicle. The at least three analog processing modules may be configured to process the electronic signals generated by the at least three audio sensors to generate one or more processed audio signals. The processor circuit may be configured to process the one or more processed audio signals generated by the at least three analog processing modules to determine a source direction of the audio sounds relative to the vehicle and identify a type characteristic of the audio sounds. The at least three analog processing modules generally process amplitude and pitch of the electronic signals using separate analog processing paths.

16 Claims, 18 Drawing Sheets

AUDIO-BASED SITUATION AWARENESS USING ANALOG PROCESSING FRONT-END FOR VEHICLES

FIELD OF THE INVENTION

The invention relates to sound detection and classification generally and, more particularly, to a method and/or apparatus for implementing audio-based situation awareness using n analog processing front-end for vehicles.

BACKGROUND

Audio-based situation awareness for vehicles (ABSAV) provides critical information to assist occupants of current vehicles, Advanced Driver-Assistance Systems (ADAS) vehicles, and fully autonomous vehicles. In open-source descriptions of ADAS vehicle architectures, an array of video components, such as cameras, LIDAR, and radar, plus various ultrasound sensors are used to detect an environment surrounding a vehicle (e.g., car, truck, bus, autonomous delivery vehicle, etc.). However, existing systems rely on the ability of a vehicle operator to hear and identify warnings, cautions, and alerts. For many reasons, the ability of the operator to listen for and identify warnings, cautions, and alerts is not always performed well. If there is no vehicle operator (e.g., in an autonomous vehicle), then there is no audio sensing and, therefore, audio-based warnings cannot be identified. This is a significant gap for safety reasons.

It would be desirable to implement audio-based situation awareness using an analog processing front-end for vehicles.

SUMMARY

The invention concerns an apparatus comprising at least three audio sensors, at least three analog audio processing modules, and a processor circuit. The at least three audio sensors may be configured to generate electronic signals in response to audio sounds in an environment surrounding a vehicle. The at least three analog audio processing modules may be configured to process the electronic signals generated by the at least three audio sensors to generate one or more processed audio signals. The processor circuit may be configured to process the one or more processed audio signals generated by the at least three analog audio processing modules to determine a source direction of the audio sounds relative to the vehicle and identify a type characteristic of the audio sounds. The at least three analog processing modules generally process amplitude and pitch of the electronic signals using separate analog audio processing paths.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
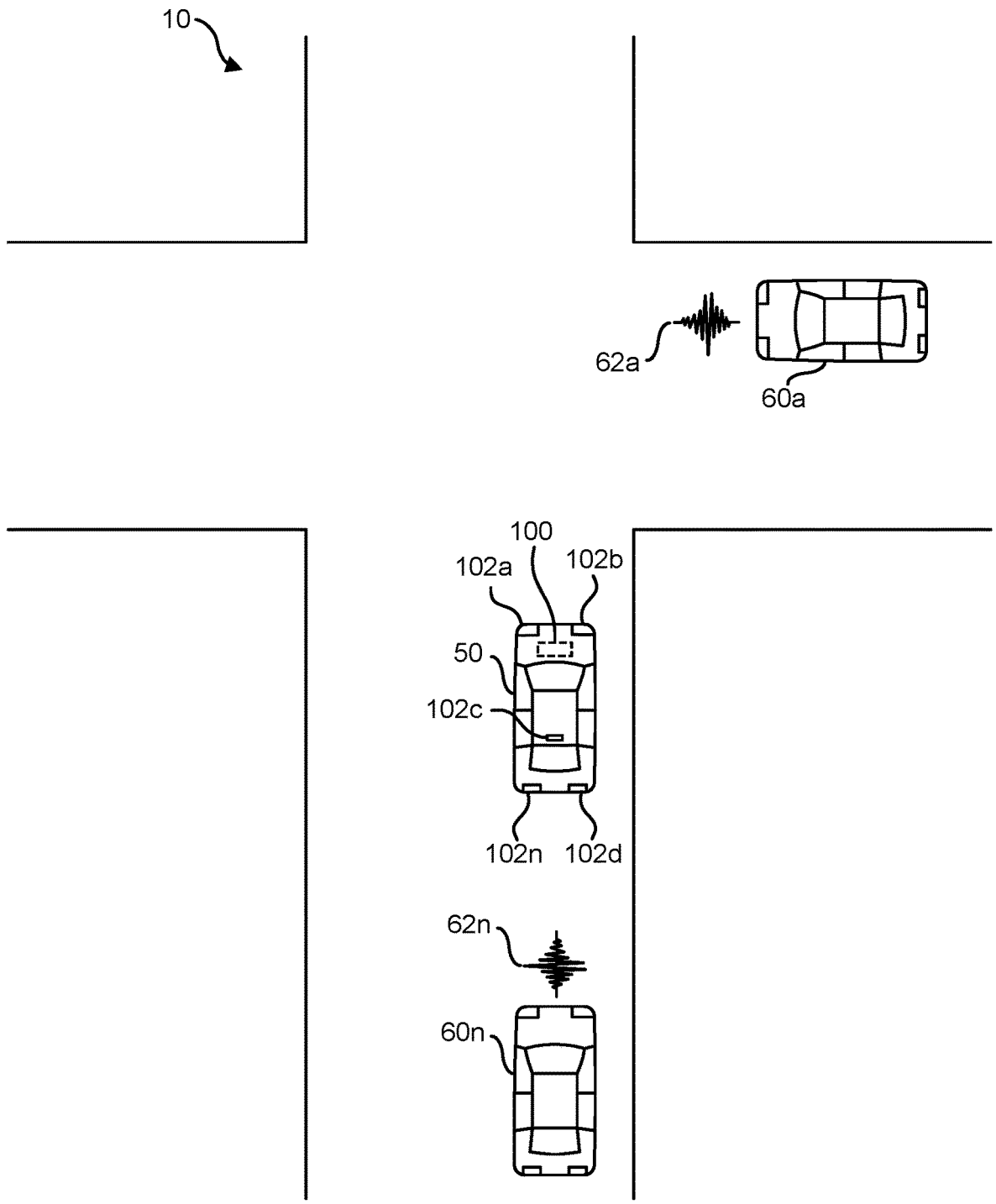
FIG. 1 is a diagram illustrating an environmental context showing a vehicle utilizing an audio-based situation awareness for vehicles system in accordance with an embodiment of the invention.

Embodiments of the present invention include providing audio-based situation awareness using an analog processing front-end for vehicles that may (i) utilize an analog processing front end to obtain samples of audio signals, (ii) process amplitude and pitch separately, (iii) provide an indication to a vehicle operator of direction and type of audio signals detected, (iv) remove pitch using an alternative to a Hilbert transform, (v) provide wide range peak detection, (vi) utilize zero-crossover information for frequency determination and pitch analysis, (vii) utilize time difference of arrival (TDOA) for direction detection, (viii) provide start of sound and insufficient amplitude detection, (ix) utilize one or more of decision trees, neural networks and/or machine learning, (x) communicate with a vehicle operator using one or more of displays and audio outputs, and/or (iv) be implemented as one or more integrated circuits.

Using more extensive processing and improved recognition techniques may produce significant safety related information that may be determined from processing audio signals from an environment surrounding a vehicle. In various embodiments, an Audio-based Situation Awareness for Vehicles (ABSAV) system is generally provided for current vehicles, for ADAS vehicles, and for fully autonomous vehicles. The ABSAV system in accordance with an embodiment of the invention may provide identification of audio (sound) types and position information that allows determining the source of the audio. In an example, a technique called "Time Difference of Arrival" (TDOA) may be used to determine the position information for the location of the sound source. In various embodiments, an ABSAV system in accordance with an embodiment of the invention generally determines the direction to the source of the sound, identifies a type (or classification) of the sound, and determines the significance of the sound. The ABSAV system in accordance with an embodiment of the invention may then send alarms, warnings, and/or cautions to a display and/or audio transducer/transmitter.

In an example, The ABSAV system in accordance with an embodiment of the invention may issue alarms, warnings, and/or cautions to an "overseer" and passengers of the vehicle. In an example, the "overseer" may be a person (e.g., an operator, driver, etc.) or an entity (e.g., computer, controller, ECU, etc.) that maintains responsibility for operation of the vehicle (e.g., like the driver does today). In general, the overseer should be in the vehicle with access to a "stop all" control. The operator is generally a person, but will more than likely evolve, over time, into an on-board electronic controller with communication to appropriate external devices of the vehicle.

In an example, The ABSAV system in accordance with an embodiment of the invention may be utilized in applications for use in commercial and private vehicles, land-based security, military vehicles, and in autonomous transporters. In an example, the ABSAV system in accordance with an embodiment of the invention may determine and report the existence and direction of sirens from police vehicles, firetrucks, and ambulances. People are injured and killed each year because they did not hear the sirens. On ADAS-based vehicles and/or autonomous vehicles, the ABSAV system may ensure that the vehicle pulls over for ambulances and police vehicles.

In an example, the ABSAV system in accordance with an embodiment of the invention may identify sounds and directions of horns, railroad crossing alarms, car alarms, people shouting, crashes, and more. In security applications, the ABSAV system may identify the direction of intruders. In various applications, the ABSAV system may point to the direction of crashes, explosions, and abnormal sounds. In an example application for use in combat vehicles, the ABSAV system may identify the direction and type of weapons fired.

Referring to FIG. 1, a diagram is shown illustrating an environmental context showing a vehicle utilizing an audio-based situation awareness for vehicles system in accordance with an embodiment of the invention. In an example, a diagram is shown illustrating an intersection 10. The intersection 10 is generally representative of roads meeting in urban and/or rural settings and forming an intersection. In an example, a vehicle 50 and a number of vehicles 60a-60n are shown. In various applications, the number of vehicles 60a-60n may vary from one to many. The vehicle 50 is shown approaching the intersection 10. The intersection 10 is not shown to scale generally. In an example, the vehicles 60a-60n may include emergency vehicles (e.g., police car, fire truck, ambulance, etc.). Distances between the vehicle 50 and the vehicles 60a-60n may be equal to, greater than, or smaller than one another. The vehicles 60a-60n may emit various respective audio signals 62a-62n (illustrated by waveforms). The audio signals 62a-62n may be configured to alert pedestrians and/or vehicles (e.g., the vehicle 50) of the presence of the vehicles 60a-60n. When one or more of the vehicles 60a-60n comprise emergency vehicles responding to an emergency situation, the audio signals 62a-62n may comprise warning sounds (e.g., siren, horn, etc.) to alert the pedestrians and operators of other vehicles (e.g., the vehicle 50) of the presence of the one or more vehicles 60a-60n and an urgency of the emergency situation.

The vehicle 50 may comprise a respective apparatus (or module or control unit) 100 and a plurality of sensors 102a-102n. In an example, the apparatus 100 may implement an advanced driver-assistance system (ADAS). In various embodiments, the apparatus 100 may implement an audio-based situation awareness for vehicles system in accordance with an embodiment of the invention. In various embodiments, each of the sensors 102a-102n may implement audio sensors/transducers (e.g., microphones). In an example, each of the sensors 102a-102n may be configured to detect/receive the audio signals 62a-62n (illustrated by the waveform lines) from the environment surrounding the vehicle 50 and convert the audio signals 62a-62n to electronic signals that may be processed by the apparatus 100. In various embodiments, at least three of the sensors 102a-102n may be implemented to allow the apparatus 100 to utilize triangulation to identify source positions of the audio signals 62a-62n.

In an example, the audio signals 62a-62n may be broadcast from one or more directions relative to the vehicle 50 (e.g., directly behind, from a side, directly ahead, etc.). In various embodiments, the apparatus 100 may be configured to process the electronic signals from the sensors 102a-102n to identify a source direction (or position) and type characteristic (e.g., horn, siren, collision, gunshot, pedestrian yelling, etc.) of each of the audio signals 62a-62n. In an example, the apparatus 100 may be configured to provide information about the source direction (or position) and type characteristic of each of the audio signals 62a-62n to an operator of the vehicle 50. In an example, the apparatus 100 may be configured to utilize a dashboard display to present a bird's eye view of the vehicle 50 with an indicator (e.g., a light, a symbol, etc.) showing the direction of the respective source(s) of the audio signals 62a-62n relative to the vehicle 50. In an example, different color light and/or different symbols may be used to convey the type characteristic (e.g., horn, siren, collision, gunshot, pedestrian yelling, etc.) of the respective audio signals 62a-62n detected. In general, the information provided by the apparatus 100 may comprise information that a hearing-impaired operator and/or autonomous vehicle 50 would not be able to become aware of absent the sensors 102a-102n and just looking at the respective surroundings of the vehicle 50 (e.g., using eyes, cameras, radar, lidar, ultrasound, etc.).

Figure 2:
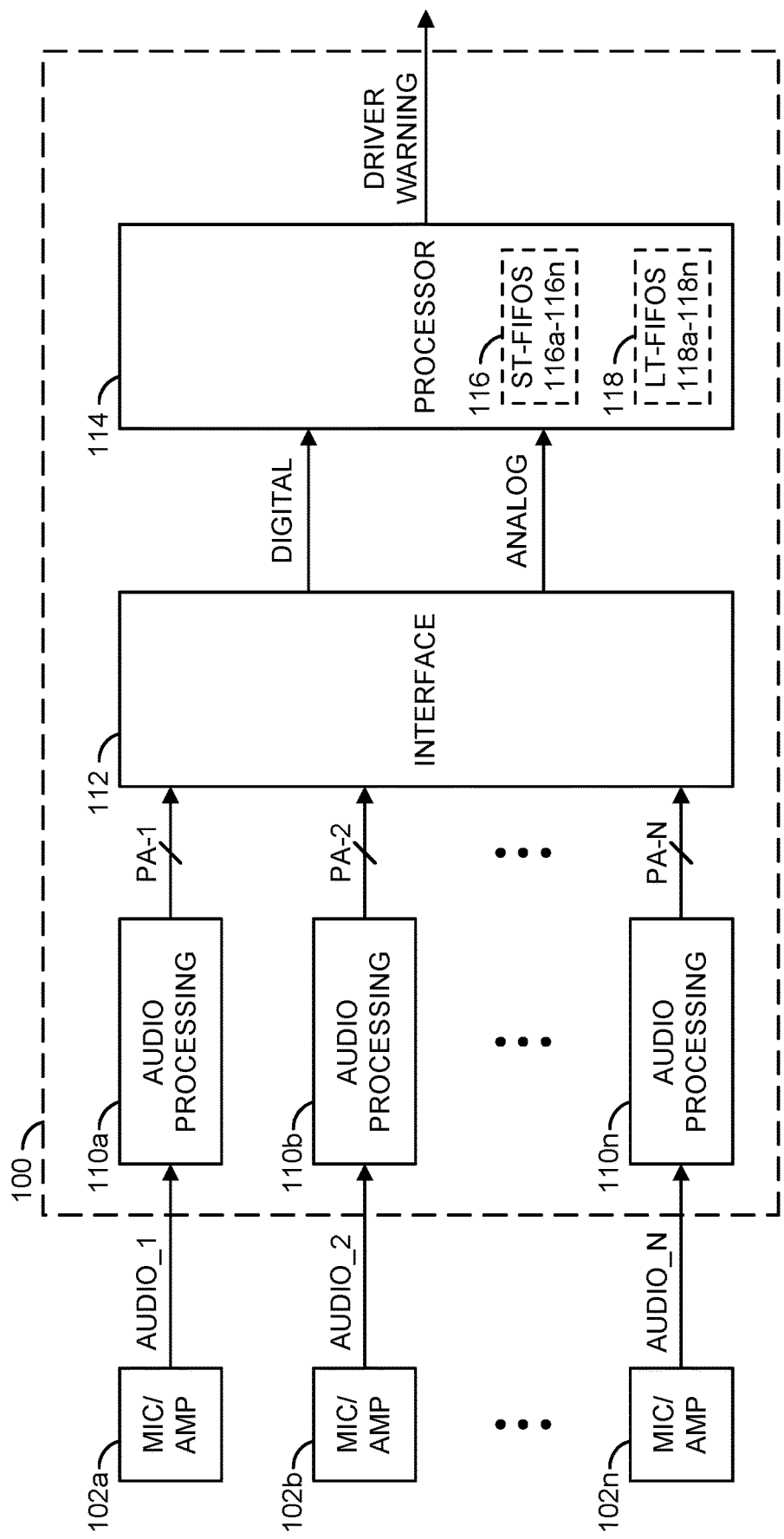
FIG. 2 is a diagram illustrating an example implementation of an audio-based situation awareness for vehicles system capable of receiving audio information from a surrounding environment of a vehicle and implementing audio-based situation awareness for vehicles in accordance with an embodiment of the invention.

Referring to FIG. 2, a diagram is shown illustrating an example advanced driver-assistance system capable of receiving audio information from a surrounding environment of a vehicle and implementing audio-based situation awareness for vehicles in accordance with an embodiment of the invention. In an example, the apparatus 100 may be implemented as part of an advanced driver-assistance system (ADAS). In various embodiments, the apparatus 100 may implement an audio-based situation awareness for vehicles system in accordance with an embodiment of the invention. In an example, the apparatus 100 may comprise a plurality of inputs configured to receive a plurality of electronic signals (e.g., AUDIO_1, AUDIO_2, . . . , AUDIO_N) from the plurality of sensors 102a-102n. In various embodiments, the plurality of sensors 102a-102n may implement audio sensors/transducers (e.g., microphones). In an example, each of the plurality of sensors 102a-102n may include an amplifier circuit coupled to the audio sensor/transducer and configured to generate a respective one of the electronic signals AUDIO_1, AUDIO_2, . . . , AUDIO_N.

In an example, the apparatus 100 may comprise a plurality of blocks (or circuits) 110a-110n, a block or (circuit) 112, and a block (or circuit) 114. In an example, each of the plurality of circuits 110a-110n may implement an analog audio processing path (or circuit). In an example, the circuit 112 may implement an interface circuit. In an example, the circuit 114 may be implemented as a processor circuit. In an example, each of the circuits 102a-102n may be coupled to a respective one of the circuits 110a-110n. In an example, an output of the circuit 102a may be configured to present the electronic signal AUDIO_1 to an input of the circuit 110a, an output of the circuit 102b may be configured to present the electronic signal AUDIO_2 to an input of the circuit 110b, etc.

In an example, the circuits 110a-110n may be configured to process a respective one of the electronic signals AUDIO_1, AUDIO_2, . . . , AUDIO_N. In an example, each of the electronic signals AUDIO_1, AUDIO_2, . . . , AUDIO_N may comprise a raw audio signal. In an example, each of the circuits 110a-110n may be configured to process amplitude and pitch of the respective one of the electronic signals AUDIO_1, AUDIO_2, . . . , AUDIO_N separately. In an example, each of the circuits 110a-110n may be configured to perform an alternative Hilbert transformation on the respective one of the electronic signals AUDIO_1, AUDIO_2, . . . , AUDIO_N. In an example, each of the circuits 110a-110n may be configured to generate a plurality of processed audio signals (e.g., PA-1, PA-2, . . . , PA-N) in response to the respective one of the electronic signals AUDIO_1, AUDIO_2, . . . , AUDIO_N. In an example, each of the processed audio signals PA-1, PA-2, . . . , PA-N may comprise an audio signal without pitch, a peak detection signal, an active packet detected signal, a no active packet detected signal, and a raw audio signal. In an example, each of the circuits 110a-110n may have an output that may present a respective one of the processed audio signals PA-1, PA-2, PA-N to a respective input of the circuit 112.

In an example, the circuit 112 may implement an interface circuit. In an example, the circuit 112 may be configured to route (direct) the audio signals without pitch, the peak detection signals, the active packet detected signals, the no active packet detected signals, and the raw audio signals received via the processed audio signals PA-1, PA-2, PA-N from the circuits 110a-110n to specific inputs of the circuit 114. In an example, the circuit 112 may have a first output that may present digital signals to a first input of the circuit 114 and a second output that may present analog signals to a second input of the circuit 114.

In an example, the circuit 114 may be implemented as a processor circuit. In general, the circuit 114 may be configured to identify the information contained in the processed audio signals and determine an appropriate response. In an example, the circuit 114 may be configured to communicate with one or more external electronic control units or modules (ECUs) of a vehicle. In an example, the circuit 114 may be configured to present warnings, cautions, warnings and alerts, etc. to displays and/or audio components of the vehicle. In an example, the circuit 114 may be configured to generate the warnings, cautions, warnings and alerts, etc. based on the signals received from the circuit 112.

In various embodiments, the circuit 114 may comprise a number of short-term first-in-first-out memories (ST-FIFOs) 116 and a number of long-term FIFO memories (LT-FIFOs) 118. In an example, the circuit 114 may implement a plurality of ST-FIFOs 116a-116n and a plurality of LT-FIFOs 118a-118n. In an example, each of the plurality of ST-FIFOs 116a-116n and each of the plurality of LT-FIFOS 118a-118n is generally associated with a respective one of the plurality of analog audio processing circuits 110a-110n. In an example, the ST-FIFOs 116 may be configured to store summary information for each audio processing channel during a minimum observation period. In an example, a minimum observation period of 100 milliseconds may be implemented. In an example, the summary information collected for each audio processing channel during the minimum observation period may correspond to a single transition (e.g., positive or negative) of the respective audio signals (e.g., AUDIO_1, AUDIO_2, . . . , AUDIO_N). In an example, the LT-FIFOs 118 may be configured to store summary information for each audio processing channel during an extended (or maximum) observation period. In an example, an extended observation period of 5 seconds may be implemented. In an example, the summary information collected for each audio processing channel during the extended observation period may correspond to frequency characteristics and/or amplitude characteristics of the respective audio signals (e.g., AUDIO_1, AUDIO_2, . . . , AUDIO_N) over the extended observation period.

In an example, during each minimum observation period audio data from each of the circuits 102a-102n may be processed by the circuits 110a-110n and stacked concurrently in each of the ST-FIFOs 116. During each minimum observation period, data in the ST-FIFOs 116 may be transferred to the corresponding LT-FIFOs 118. During each minimum observation period, data in the LT-FIFOs 118 may be processed and evaluated to determine an identification of the audio signals AUDIO_1, AUDIO_2, . . . , AUDIO_N.

Figure 3:
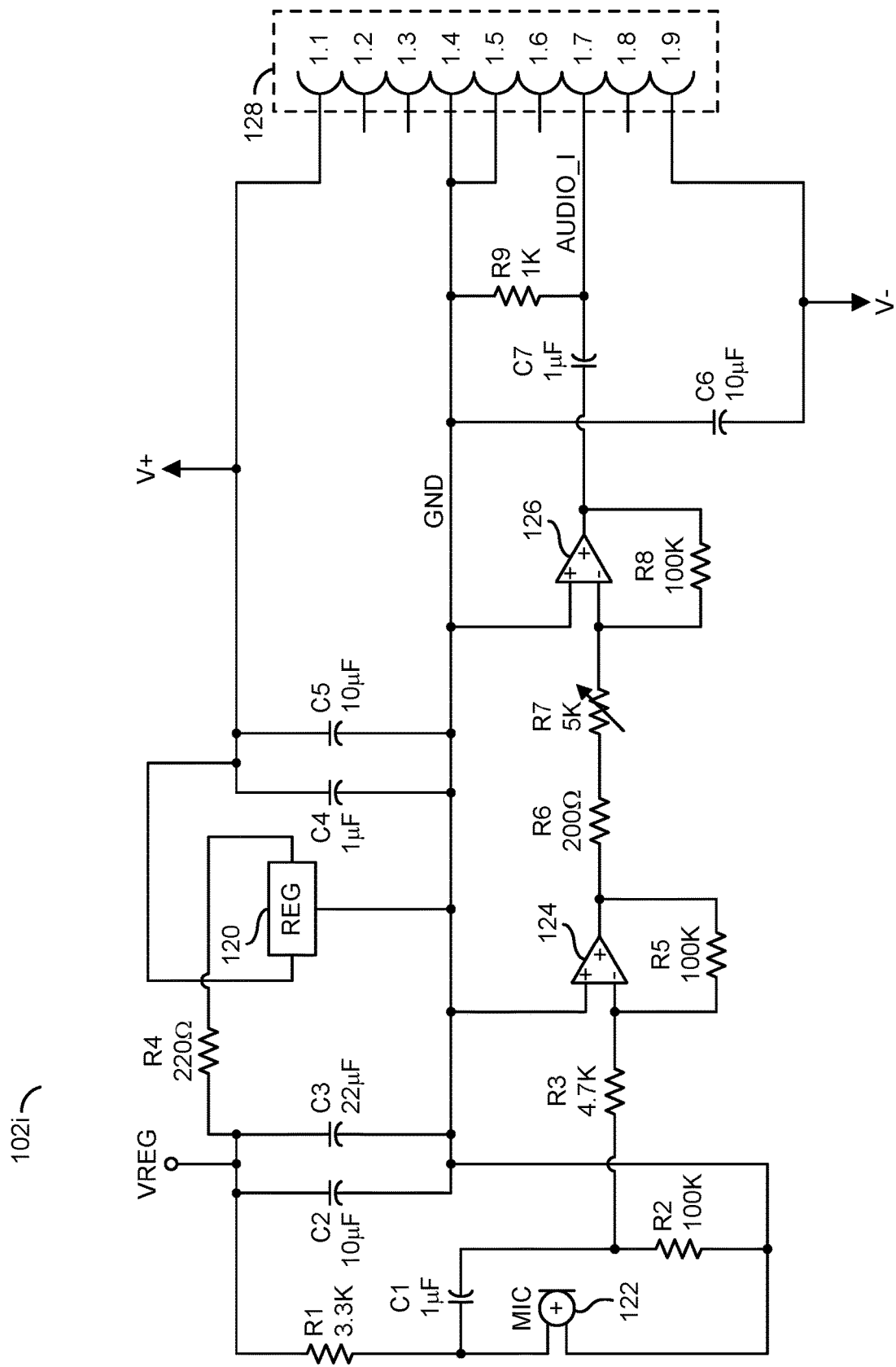
FIG. 3 is a diagram illustrating an example audio sensor circuit of the audio-based situation awareness for vehicles system of FIG. 2.

Referring to FIG. 3, a diagram is shown illustrating an example implementation of an audio sensor circuit of the advanced driver-assistance system of FIG. 2. In an example, one of the audio sensors 102a-102n (e.g., an audio sensor circuit 102i) may be representative of the audio sensor circuits 102a-102n. In an example, the audio sensor circuit 102i may comprise a block (or circuit) 120, a block or (circuit) 122, a block or (circuit) 124, a block or (circuit) 126, a number of resistors R1-R9, and a number of capacitors C1-C7. The circuit 120 may be implemented as a voltage regulator. The circuit 122 may be implemented as a microphone. The circuit 124 and 126 may be implemented as operational amplifiers (opamps). In an example, the audio sensor circuit 102i may receive and send signals via a nine-pin connector 128. In an example, pin 1 of the connector 128 may receive a positive supply voltage (e.g., V+), pins 4 and 5 of the connector 128 may receive a circuit ground potential (e.g., GND), and pin 9 of the connector 128 may receive a negative supply voltage (e.g., V−). In an example, an electrical signal (e.g., AUDIO_I) generated by the circuit 102i may be communicated to other circuitry via pin 7 of the connector 128.

In an example, the positive supply voltage V+ may be presented to a first (input) terminal of the circuit 120, a first terminal of the capacitor C5, and a first terminal of the capacitor C6. A second (ground) terminal of the circuit 120, a second terminal of the capacitor C5, and a second terminal of the capacitor C6 may be connected to the circuit ground potential GND. A third (output) terminal of the circuit 120 may be connected to a first terminal of the resistor R4. The second terminal of the resistor R4 may be connected to a first terminal of the resistor R1, a first terminal of the capacitor C2, and a first terminal of the capacitor C3. A regulated supply voltage (e.g., VREG) may be presented at a node formed by the connection of the second terminal of the resistor R4, the first terminal of the resistor R1, the first terminal of the capacitor C2, and the first terminal of the capacitor C3. A second terminal of the capacitor C2 and a second terminal of the capacitor C3 may be connected to the circuit ground potential GND.

A second terminal of the resistor R1 may be connected to a first terminal if the circuit 122 and a first terminal of the capacitor C1. A second terminal of the circuit 122 and a first terminal of the resistor R2 may be connected to the circuit ground potential GND. A second terminal of the capacitor C1 and a second terminal of the resistor R2 may be connected to a first terminal of the resistor R3. A second terminal of the resistor R3 may be connected to a first input (−) terminal of the circuit 124 and a first terminal of the resistor R5. A second input (+) terminal of the circuit 124 may be connected to the circuit ground potential GND. An output terminal of the circuit 124 may be connected to a second terminal of the resistor R5 and a first terminal of the resistor R6. A second terminal of the resistor R6 may be connected to a first terminal of the resistor R7. A second terminal of the resistor R7 may be connected to a first input (−) terminal of the circuit 126 and a first terminal of the resistor R8. A second input (+) terminal of the circuit 126 may be connected to the circuit ground potential GND. An output terminal of the circuit 126 may be connected to a second terminal of the resistor R8 and a first terminal of the capacitor C7. The capacitor C6 may be connected between the circuit ground potential GND and the negative supply voltage V−. A second terminal of the capacitor C7 may be connected to a first terminal of the resistor R9 and pin 7 of the connector. A second terminal of the resistor R9 may be connected to the circuit ground potential GND. The signal AUDIO_I may be presented at a node formed by the connection of the second terminal of the capacitor C7, the first terminal of the resistor R9, and the pin 7 of the connector 128.

Figure 4:
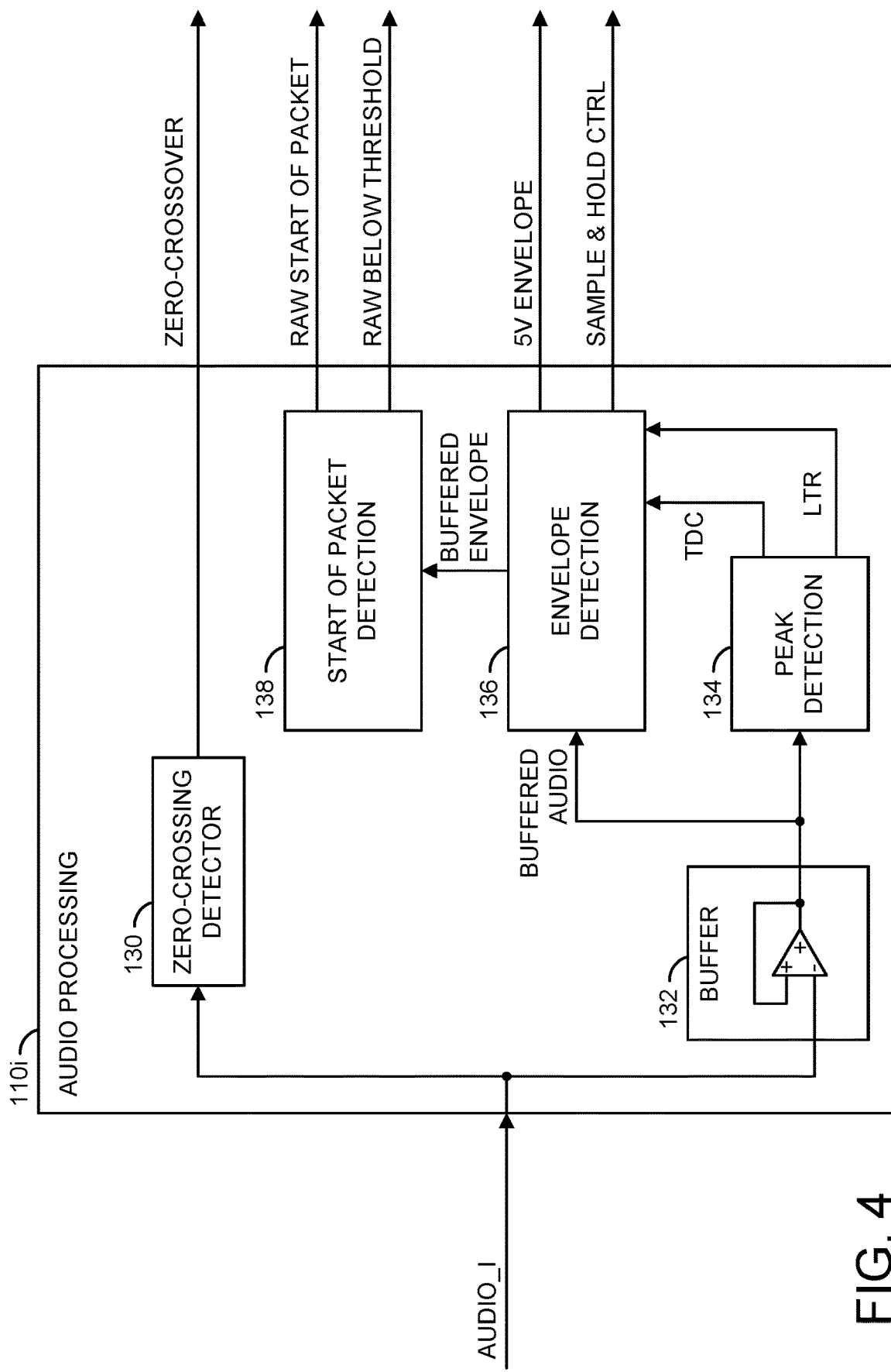
FIG. 4 is a diagram illustrating an example analog audio processing circuit of the audio-based situation awareness for vehicles system of FIG. 2.

Referring to FIG. 4, a diagram is shown illustrating an example audio processing circuit of the audio-based situation awareness for vehicles system of FIG. 2. In an example, one of the analog audio processing circuits 110a-110n (e.g., an analog audio processing circuit 110i) may be representative of the analog audio processing circuits 110a-110n. In an example, the circuit 110i may have an input that may receive raw microphone audio from a respective audio sensor circuit 102i (e.g., via the corresponding electrical signal AUDIO_I generated by the audio sensor circuit 102i). In an example, the circuit 110i may have a first output that may present a signal (e.g., ZERO-CROSSOVER), a second output that may present a signal (e.g., RAW START OF PACKET), a third output that may present a signal (e.g., RAW BELOW THRESHOLD), a fourth output that may present a signal (e.g., 5V ENVELOPE), and a fifth output that may present a signal (e.g., SAMPLE & HOLD CTRL). In an example, the signal SAMPLE & HOLD CTRL may be omitted in a system implementing a sample and hold feature in subsequent circuitry (e.g., a processor).

In an example, the audio processing circuit 110i may comprise a block (or circuit) 130, a block or (circuit) 132, a block or (circuit) 134, a block or (circuit) 136, and a block (or circuit) 138. The circuit 130 may be implemented as a zero-crossing detector circuit. The circuit 132 may be implemented as a buffer (or driver) circuit. In an example, the circuit 132 may be implemented using an operational amplifier configured as a unity-gain amplifier circuit. The circuit 134 may be implemented as a peak detector circuit.

In an example, the circuit 130 may have an input that may receive the signal AUDIO_I conveying the raw microphone audio from the respective audio sensor circuit 102i and an output that may present the signal ZERO CROSSOVER. In an example, the circuit 132 may have an input that may receive the signal AUDIO_I conveying the raw microphone audio from the respective audio sensor circuit 102i and an output that may present a signal (e.g., BUFFERED AUDIO). The signal BUFFERED AUDIO may be equivalent to the signal AUDIO_I, but provide a greater fanout than the output of the respective audio sensor circuit 102i. In an example, the circuit 134 may have an input that may receive the signal BUFFERED AUDIO from the circuit 132, a first output that may present a first intermediate signal (e.g., TDC), and a second output that may present a second intermediate signal (e.g., LTR). The intermediate signals TDC and LTR may convey detailed information about an audio cycle. In an example, the signal LTR generally indicates that the incoming signal value is negative and insures that a one-shot of the peak detector is reset. In an example, the signal TDC generally indicates when the charge rate of the peak detector circuit is below a negative threshold, indicating top dead center of the audio cycle. In an example, the circuit 136 may have an input that may receive the signal BUFFERED AUDIO from the circuit 132, a second input that may receive the first intermediate signal TDC, a third input that may receive the second intermediate signal LTR, a first output that may present a signal (e.g., BUFFERED ENVELOPE), a second output that may present the signal 5V ENVELOPE, and a third output that may present the signal SAMPLE & HOLD CTRL. In an example, the signal BUFFERED ENVELOPE may be implemented as an output signal to provide a test point to verify the signal at full range. In an example, external access to the signal BUFFERED ENVELOPE may be omitted in final production implementations.

Figure 5:
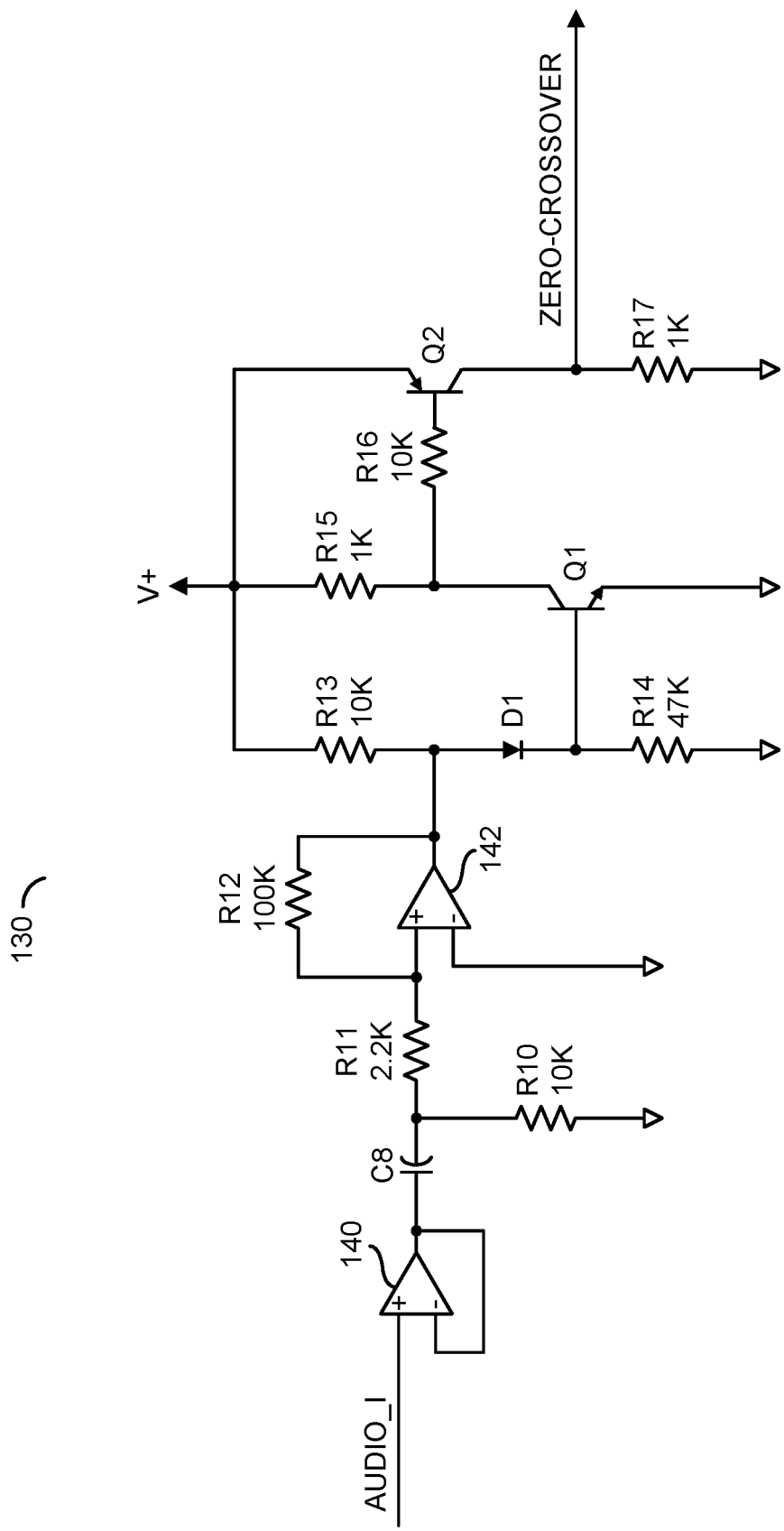
FIG. 5 is a diagram illustrating an example implementation of a zero-crossing detector circuit of the audio-based situation awareness for vehicles system of FIG. 4.

Referring to FIG. 5, a diagram is shown illustrating an example implementation of the zero-crossing detector circuit of the analog audio processing module 110i of FIG. 4. In an example, the zero-crossing detector circuit 130 may comprise a block (or circuit) 140, a block or (circuit) 142, a first transistor Q1, a second transistor Q2, a number of resistors R10-R17, a capacitor C8, and a diode D1. In an example, the circuits 140 and 142 may be implemented as operational amplifiers. In an example, the circuit 140 may be configured as a unity-gain amplifier. In an example, the transistor Q1 may comprise a npn bipolar transistor. In an example, the transistor Q2 may comprise a pnp bipolar transistor.

In an example, the raw microphone audio conveyed by the signal AUDIO_I may be presented to a first input (+) terminal of the circuit 140. A second input (−) terminal of the circuit 140 may be connected to an output terminal of the circuit 140 and a first terminal of the capacitor C8. A second terminal of the capacitor C8 may be connected to a first terminal of the resistor R10 and a first terminal of the resistor R11. A second terminal of the resistor R10 may be connected to the circuit ground potential. A second terminal of the resistor R11 may be connected to a first input (+) of the circuit 142 and a first terminal of the resistor R12. A second input (−) terminal of the circuit 142 may be connected to the circuit ground potential. A second terminal of the resistor R12 may be connected to an output terminal of the circuit 142, a first terminal of the resistor R13, and an anode terminal of the diode D1. A second terminal of the resistor R13 may be connected to the positive supply voltage V+. A cathode terminal of the diode D1 may be connected to a base terminal of the transistor Q1 and a first terminal of the resistor R14. A second terminal of the resistor R14 and an emitter terminal of the transistor Q1 may be connected to the circuit ground potential. A collector terminal of the transistor Q1 may be connected to a first terminal of the resistor R15 and a first terminal of the resistor R16. A second terminal of the resistor R15 may be connected to the positive supply voltage V+. A second terminal of the resistor R16 may be connected to a base terminal of the transistor Q2. An emitter terminal of the transistor Q2 may be connected to the positive supply voltage V+. A collector terminal of the transistor Q2 may be connected to a first terminal of the resistor R17. A second terminal of the resistor R17 may be connected to the circuit ground potential. The signal ZERO-CROSSOVER may be presented at a node formed by the connection of the collector terminal of the transistor Q2 and the first terminal of the resistor R17.

Figure 6:
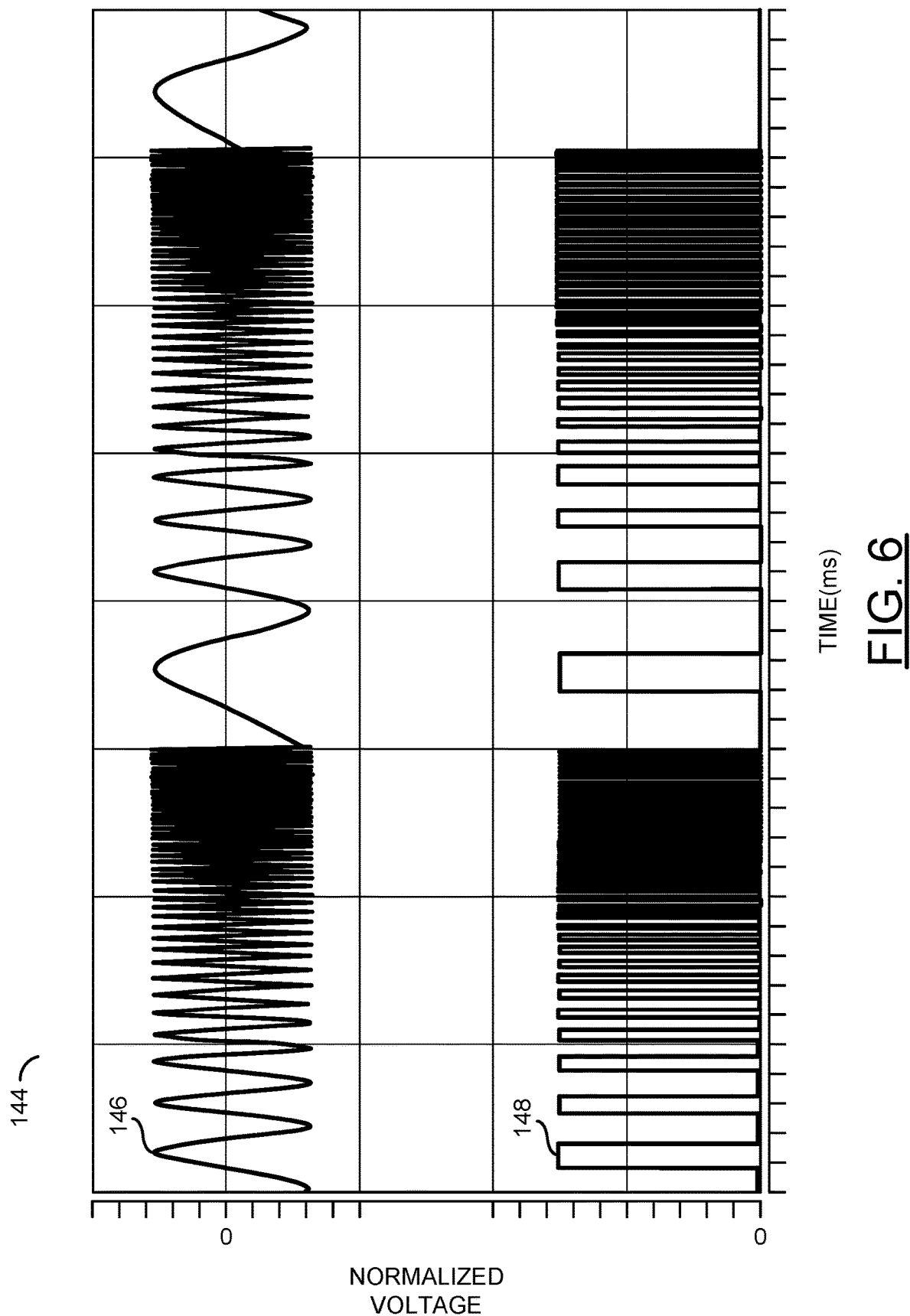
FIG. 6 is a diagram illustrating a multiple frequency signal and method for identifying the multiple frequencies.

Referring to FIG. 6, a diagram of a graph 144 is shown illustrating a comparison between a varying frequency audio input signal and the signal ZERO-CROSSOVER. A curve 146 generally illustrates a waveform of the signal AUDIO_I comprising a varying frequency. A curve 148 generally illustrates a waveform of the signal ZERO-CROSSOVER generated by the zero-crossing detector circuit 130 in response to the signal AUDIO_I. In an example, the zero-crossing detector circuit 130 generally generates the signal ZERO-CROSSOVER comprising a digital square-wave signal where each transition (or edge) corresponds to the signal AUDIO_I changing from positive to negative and from negative to positive. In an example, multiple frequencies contained in the signal AUDIO_I may be identified by analyzing timing relationships of the transitions (edges) of the signal ZERO CROSSOVER. In an example, time between transitions may be used to calculate the frequency components of the signal AUDIO_I.

In various embodiments, the zero-crossover data may be used to establish the frequencies contained in the analog signals AUDIO A, . . . , AUDIO_N. In an example, time between transitions may be used to calculate the frequency components of the analog signals AUDIO A, . . . , AUDIO_N. In an example, the frequencies may be computed by the following Equation 1:

$$\text{Frequency} = 1/(2*(t_k - t_{k+1}),\qquad \text{EQ.1}$$

where tk is the time of the first zero-crossover transition and tk+1 is the time of the following zero-crossover transition. In an example, the accumulation of these frequency values over a frequency sampling period may be used as a signature of the signal and may be compared with signatures from known sources to identify the classification (e.g., type characteristic) of the signal.

Figure 7:
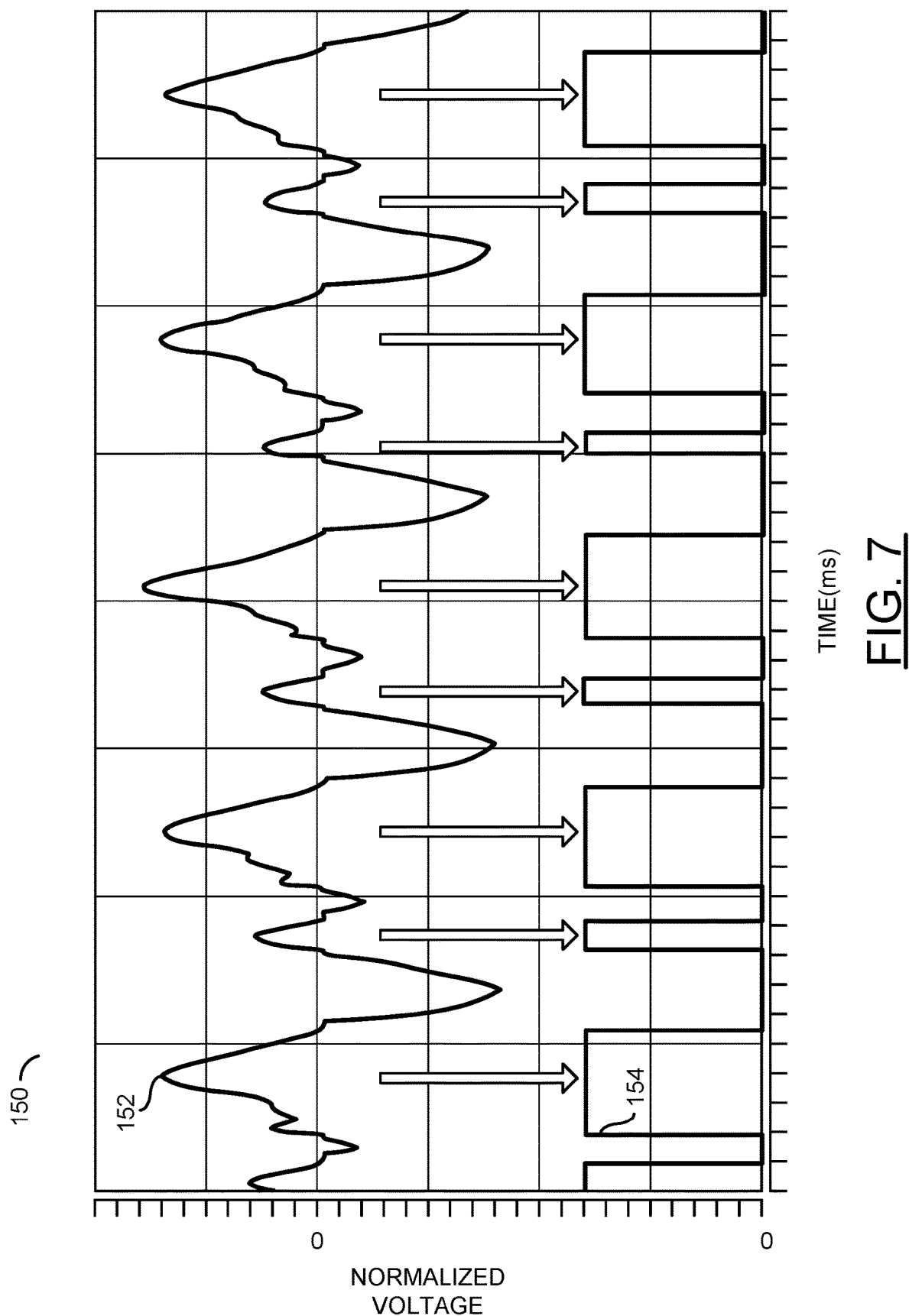
FIG. 7 is a diagram illustrating zero-crossing detection with multiple frequency determination.

Referring to FIG. 7, a diagram of a graph 150 is shown illustrating zero-crossing detection with multiple frequency determination. A curve 152 generally illustrates a waveform of the signal AUDIO_I comprising multiple frequencies. A curve 154 generally illustrates a waveform of the signal ZERO-CROSSOVER generated by the zero-crossing detector circuit 130 in response to the signal AUDIO_I. A number of arrows are also shown identifying locations (e.g., times) of positive peaks (e.g., top dead center values) for the signal AUDIO_I. In an example, the period of time that the signal is above zero volts may be used to calculate the component frequencies. In an example where the signal comprises two frequencies that are characterized, both of the frequencies may be used to identify the source of the signals.

Figure 8:
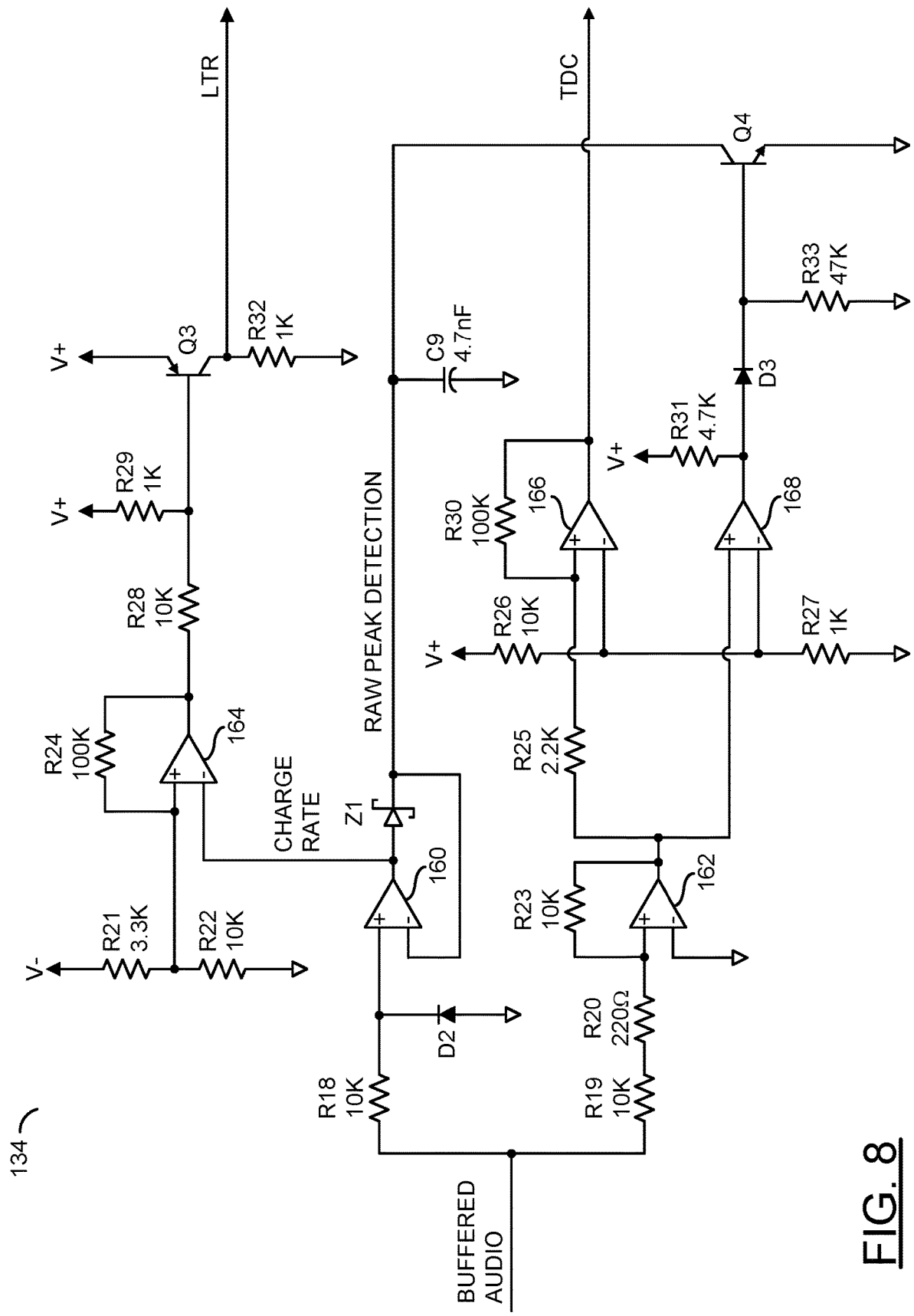
FIG. 8 is a diagram illustrating an example implementation of a peak detection circuit of the audio-based situation awareness for vehicles system of FIG. 4.

Referring to FIG. 8, a diagram is shown illustrating a peak detection circuit 134 of the analog audio processing module 110i of FIG. 4. The peak detection circuit 134 is generally configured to facilitate the sampling of the audio input at the peak of the audio signal AUDIO_I. The peak detection circuit 134 generally determines the peak point of the audio pitch (carrier signal). In an example, the peak detection circuit 134 may comprise a block (or circuit) 160, a block or (circuit) 162, a block (or circuit) 164, a block or (circuit) 166, a block (or circuit) 168, a third transistor Q3, a fourth transistor Q4, a number of resistors R18-R33, a capacitor C9, a diode D2, a diode D3, and a zener diode Z1. In an example, the circuits 160-168 may be implemented as an operation amplifiers. In an example, the transistor Q3 may comprise a pnp bipolar transistor. In an example, the transistor Q4 may comprise a npn bipolar transistor.

In an example, the signal BUFFERED AUDIO may be presented to a first terminal of the resistor R18 and a first terminal of the resistor R19. A second terminal of the resistor R18 may be connected to a cathode terminal of the diode D2 and a first input terminal of the circuit 160. A second terminal of the resistor R19 may be connected to a first terminal of the resistor R20. A second terminal of the resistor R20 may be connected to a first input terminal of the circuit 162 and a first terminal of the resistor R23. A second input terminal of the circuit 160 may be connected to a cathode terminal of the zener diode Z1, a first terminal of the capacitor C9, and a collector terminal of the transistor Q4. An output terminal of the circuit 160 may be connected to an anode terminal of the zener diode Z1 and a first input terminal of the circuit 64. The output of the circuit 160 generally determines a charge rate of the capacitor C9. A second input terminal of the circuit 162 may be connected to the circuit ground potential. An output of the circuit 162 may be connected to a second terminal of the resistor R23, a first terminal of the resistor R24, and a first input terminal of the circuit 168. A second terminal of the resistor R25 may be connected to a first input terminal of the circuit 166 and a first terminal of the resistor R30. A second input terminal of the circuit 166 and a second input terminal of the circuit 168 may be connected to a node formed by connection of a first terminal of the resistor R26 and a first terminal of the resistor R27. A second terminal of the resistor R26 may be connected to the positive supply voltage V+. A second terminal of the resistor R27 may be connected to the circuit ground potential. A second terminal of the resistor R30 may be connected to an output terminal of the circuit 166. The signal TDC is generally presented by the output terminal of the circuit 166. An output terminal of the circuit 168 may be connected to a first terminal of the resistor R31 and an anode terminal of the diode D3. A second terminal of the resistor R31 may be connected to the positive supply voltage V+. A cathode terminal of the diode D3 may be connected to a first terminal of the resistor R33 and a base terminal of the transistor Q4. An emitter terminal of the transistor Q4 may be connected to the circuit ground potential.

A second input terminal of the circuit 164 may be connected to a first terminal of the resistor R24 and a node formed by connection of a first terminal of the resistor R21 and a first terminal of the resistor R22. A second terminal of the resistor R21 may be connected to the positive supply voltage V+. A second terminal of the resistor R22 may be connected to the circuit ground potential. An output terminal of the circuit 164 may be connected to a second terminal of the resistor R24 and a first terminal of the resistor R28. A second terminal of the resistor R28 may be connected to a first terminal of the resistor R29 and a base terminal of the transistor Q3. An emitter terminal of the transistor Q3 may be connected to the positive supply voltage V+. A collector terminal of the transistor Q3 may be connected to a first terminal of the resistor R32. A second terminal of the resistor R32 may be connected to the circuit ground potential. The signal LTR is generally presented at a node formed by the collector terminal of the transistor Q3 and the first terminal of the resistor R32.

Figure 9:
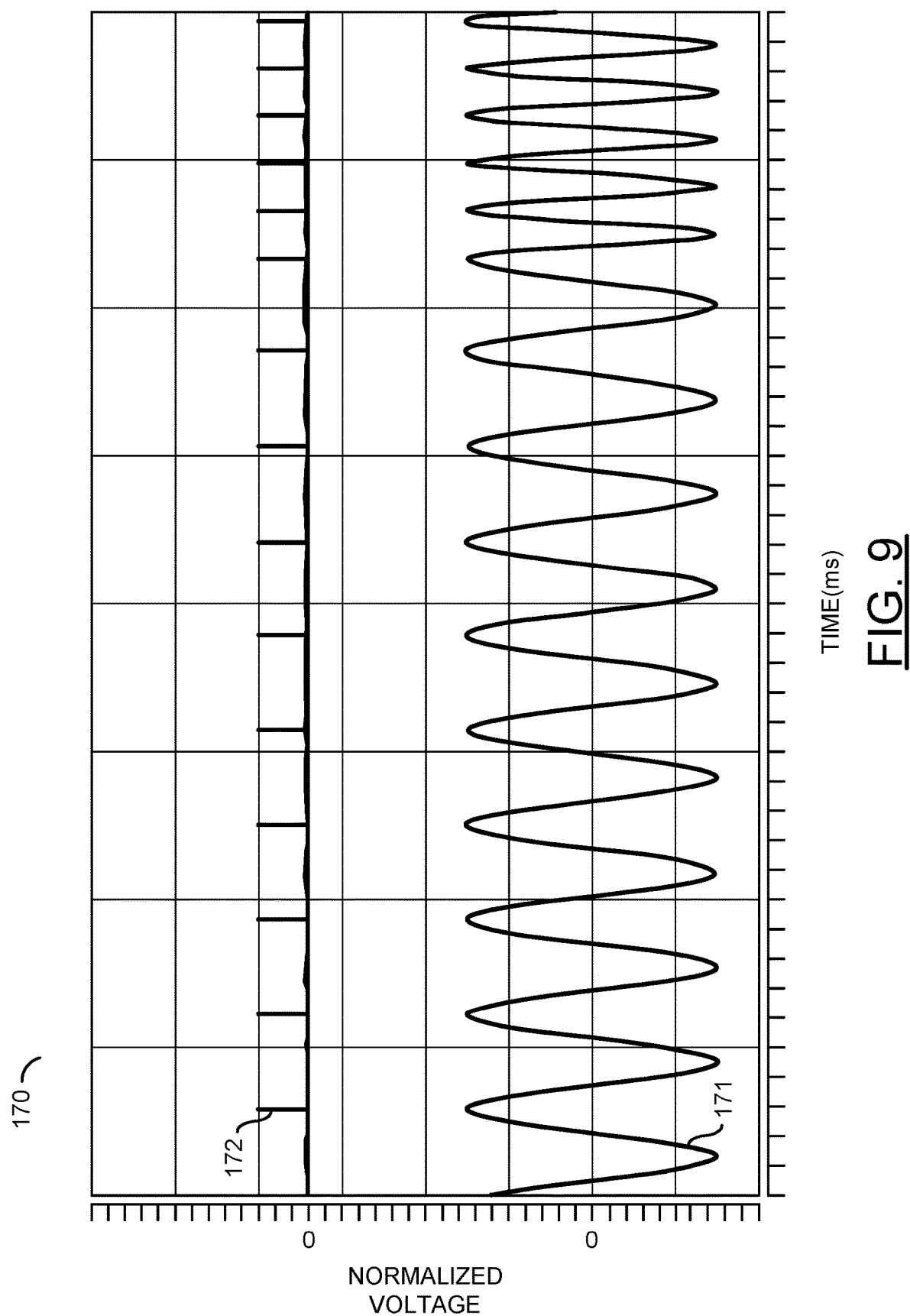
FIG. 9 is a diagram illustrating identification of peaks.

Referring to FIG. 9, a diagram of a graph 170 is shown illustrating identification of peaks. In an example, a curve 171 generally illustrates a waveform of the signal AUDIO_I. A curve 172 generally illustrates a waveform of the signal TDC generated by the peak detection circuit 134 in response to the signal AUDIO_I. The peak detection circuit 134 is generally configured to facilitate the sampling of the audio input at the peak of the audio signal AUDIO_I. The peak detection circuit 134 generally determines the peak point of the audio pitch (carrier signal). In embodiments where additional resolution is desired, a second instance of the peak detection circuit 134 may be implemented and configured to detect the negative peaks (e.g., generating a signal identifying bottom dead center of the negative peaks of the signal AUDIO_I.

Figure 10:
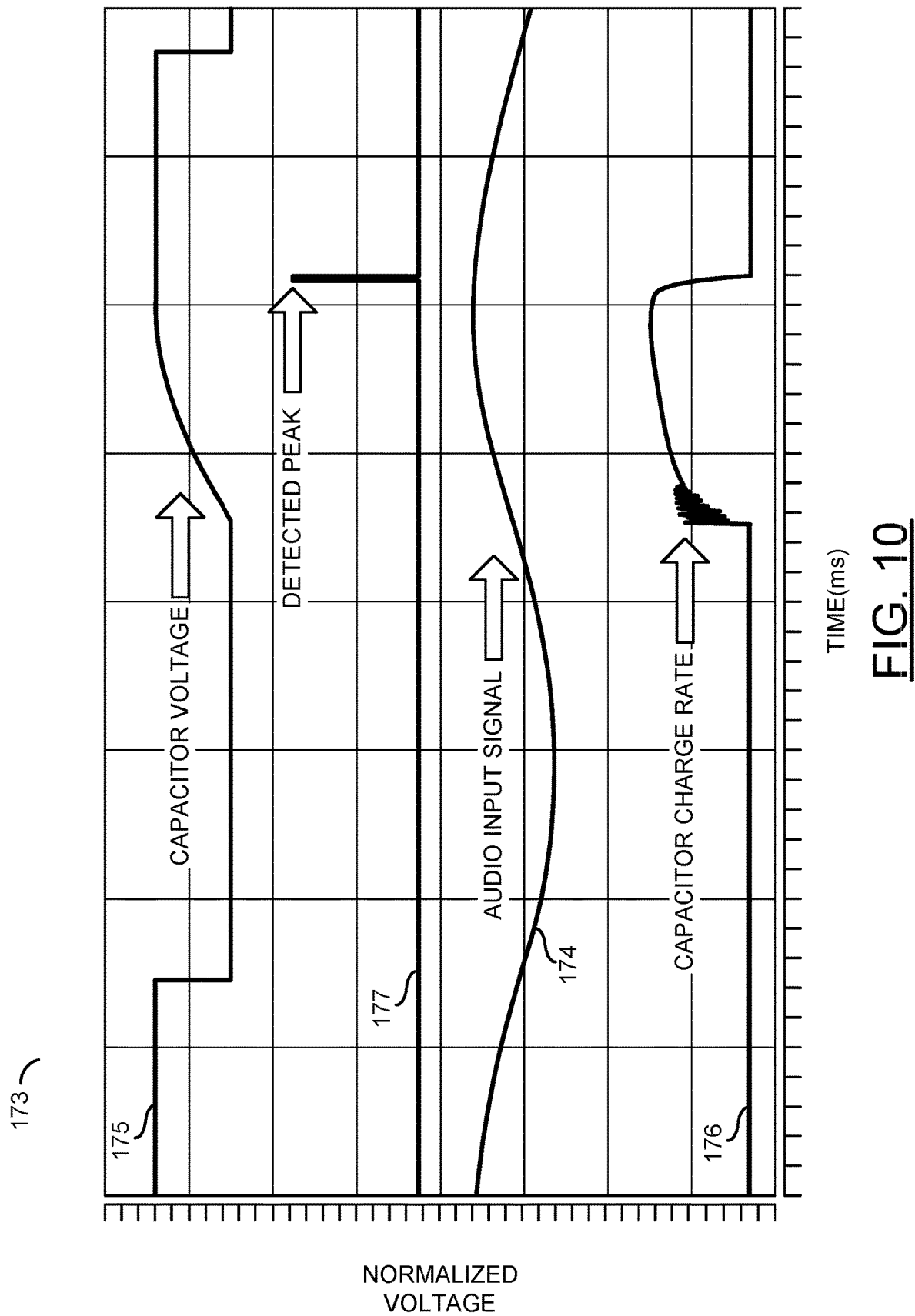
FIG. 10 is a diagram illustrating operation of the peak detection circuit of FIG. 8.

Referring to FIG. 10, a diagram of a graph 173 is shown illustrating operation of the peak detection circuit 134 of FIG. 8. In an example, a curve 174 generally illustrates a waveform of the signal AUDIO_I. A curve 175 generally represents a waveform illustrating a voltage level of the capacitor C9 over time. A curve 176 generally illustrates a waveform showing a charging rate of the capacitor C9 over time. A curve 177 generally illustrates a waveform of the signal TDC generated by the peak detection circuit 134 in response to the signal AUDIO_I. The peak detection circuit 134 is generally configured to generate a pulse in the signal TDC at the each peak of the audio signal AUDIO_I. The peak detection circuit 134 generally determines the peak point of the audio pitch (carrier signal) by charging the capacitor C9 to the voltage at the input, but not discharging the capacitor C9. The charging rate on the capacitor C9 is then monitored. When the charge drops below a predetermined set point (illustrated by the curve 176), the signal TDC is asserted to identify the peak location and trigger the analog-to-digital sample. The charge on the capacitor C9 is reset when the audio signal is below the trigger point which is slightly positive.

Figure 11:
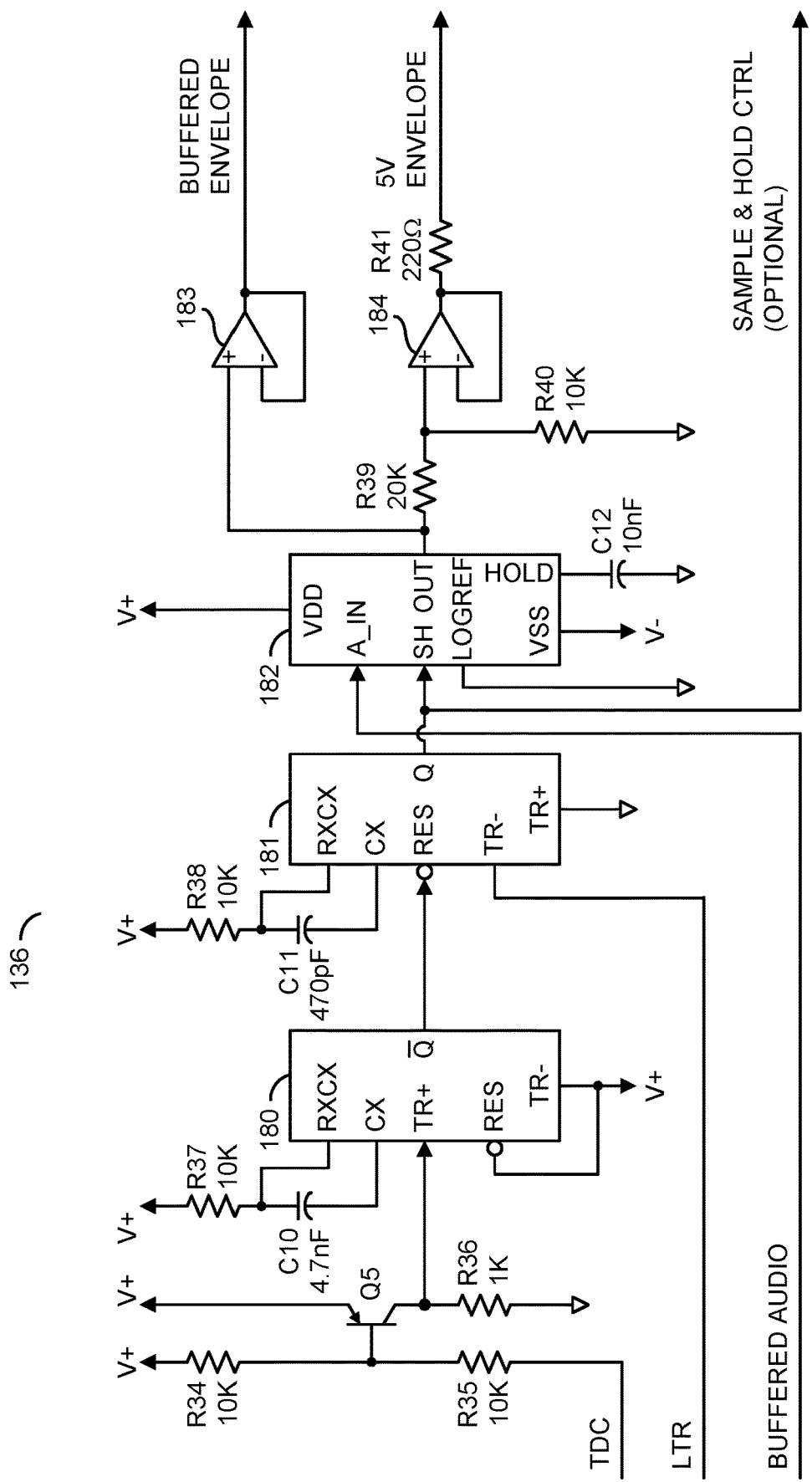
FIG. 11 is a diagram illustrating an example implementation of an envelope detection circuit of the audio-based situation awareness for vehicles system of FIG. 4.

Referring to FIG. 11, a diagram is shown illustrating an example envelope detection circuit of the analog audio processing module 110i of FIG. 4. In an example, the envelope detection circuit 136 may comprise a block (or circuit) 180, a block or (circuit) 181, a block (or circuit) 182, a block or (circuit) 183, a block (or circuit) 184, a fifth transistor Q5, a number of resistors R34-R41, and a number of capacitors C10-C12. In an example, the circuits 180 and 181 may be implemented as monostable multivibrator circuits. In an example, the transistor Q3 may comprise a pnp bipolar transistor. In an example, the circuit 182 may be implemented as sample-and-hold circuit. In an example, the circuits 183 and 184 may be implemented as operational amplifiers configured as unit-gain amplifiers. In an example, the transistor Q5 may comprise a pnp bipolar transistor.

The signal INT_A may be presented to a first terminal of the resistor R35. A second terminal of the resistor R35 may be connected to a first terminal of the resistor R34 and a base terminal of the transistor Q5. An emitter terminal of the transistor Q5 may be connected to the positive supply voltage V+. A collector terminal of the transistor Q5 may be connected to a first terminal of the resistor R36 and a leading edge triggering (TR+) input terminal of the circuit 180. A second terminal of the resistor R36, a reset input terminal and a trailing edge triggered (TR−) input terminal of the circuit 180 may be connected to the circuit ground potential. A first terminal of the resistor R37 may be connected to the positive supply voltage V+. a second terminal of the resistor R37 may be connected to a first terminal of the capacitor C10 and an external resistor input of the circuit 180. A second terminal of the capacitor C10 may be connected to an external capacitor input terminal of the circuit 180.

A complementary output (Qbar) terminal of the circuit 180 may be connected to a reset input of the circuit 181. The signal INT_B may be presented to a trailing edge triggering (TR−) input terminal of the circuit 181. A leading edge triggered (TR+) input terminal of the circuit 181 may be connected to the circuit ground potential. A first terminal of the resistor R38 may be connected to the positive supply voltage V+. a second terminal of the resistor R38 may be connected to a first terminal of the capacitor C11 and an external resistor input of the circuit 181. A second terminal of the capacitor C11 may be connected to an external capacitor input terminal of the circuit 181.

A true (Q) output terminal of the circuit 181 may be presented to a sample-and-hold (SH) control input of the circuit 182. The signal BUFFERED AUDIO maybe presented to an analog input (A_IN) of the circuit 182. A logic reference (LOGREF) terminal of the circuit 182 may be connected to the circuit ground potential. The positive supply voltage V+ may be applied to a positive supply terminal (VDD) of the circuit 182. A negative supply terminal (VSS) of the circuit 182 may be connected to the negative supply voltage V−. The capacitor C12 may be connected between a hold capacitor (HOLD) terminal of the circuit 182 and the circuit ground potential. An output terminal of the circuit 182 may be connected to a first input of the circuit 183 and a first terminal of the resistor R39. A second terminal of the resistor R39 may be connected to a first terminal of the resistor R40 and a first input terminal of the circuit 184. A second input terminal of the circuit 183 may be connected to an output terminal of the circuit 183 to form a unity-gain amplifier. The signal BUFFERED ENVELOPE may be presented at the output terminal of the circuit 183. A second input terminal of the circuit 184 may be connected to an output terminal of the circuit 184 to form a unity-gain amplifier. The output terminal of the circuit 184 may be connected to a first terminal of the resistor R41. The signal 5V ENVELOPE may be presented at a second terminal of the resistor R41. The signal 5V ENVELOPE may be used to reduce the voltage of the audio envelope signal to a level that is compatible with an analog-to-digital converter (ADC) input of the processor 114. In some embodiments, the true (Q) output terminal of the circuit 181 may be presented as a sample and hold control signal (e.g., SAMPLE & HOLD CTRL) to the processor circuit interface 112. The sample and hold control signal SAMPLE & HOLD CTRL may be used to input raw audio data into the analog-to-digital convertor of the processor 114. Thus, removing the need for a sample and hold IC and reducing cost.

Figure 12:
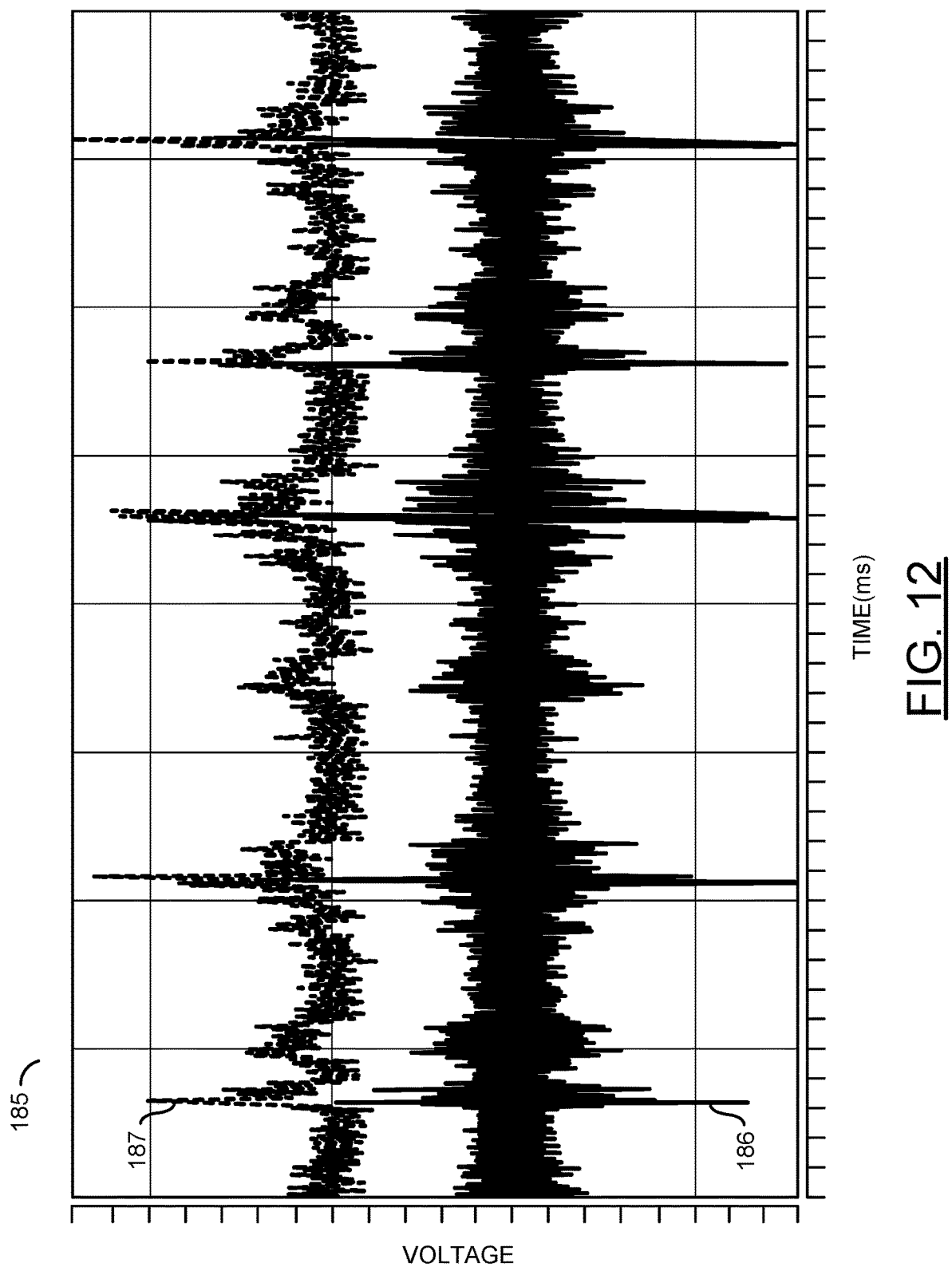
FIG. 12 is a diagram illustrating a comparison between an audio input signal and an alternate Hilbert transformation output signal of the envelope detection circuit of FIG. 11.

Referring to FIG. 12, a diagram of a graph 185 is shown illustrating an audio input signal and an alternate Hilbert transformation output signal generate in response to the audio input signal. In an example, a curve 186 generally illustrates a waveform of the signal AUDIO_I. A curve 187 generally illustrates a waveform of the signal BUFFERED ENVELOPE generated by the envelope detection circuit 136 in response to the signal AUDIO_I. In various embodiments, the signal BUFFERED ENVELOPE conveys the peak values of the signal AUDIO_I over time. In an example, the raw audio input signal AUDIO_I generally includes a carrier pitch (frequency). The signal BUFFERED ENVELOPE generally has the carrier pitch removed by sampling the data only at the peaks of the audio signal AUDIO_I. This is done by shifting the phase of the carrier signal by 90 degrees and sampling the envelope signal only at the time of the peak amplitude of the cycle. In an example, curve 186 illustrates the input signal AUDIO_I comprising a carrier wave. The curve 187 illustrates the output signal BUFFERED ENVELOPE having the carrier signal(s) removed, which results in the envelope of the input signal. The envelope of the input signal is generally equivalent to the output of a Hilbert Transform.

Figure 13:
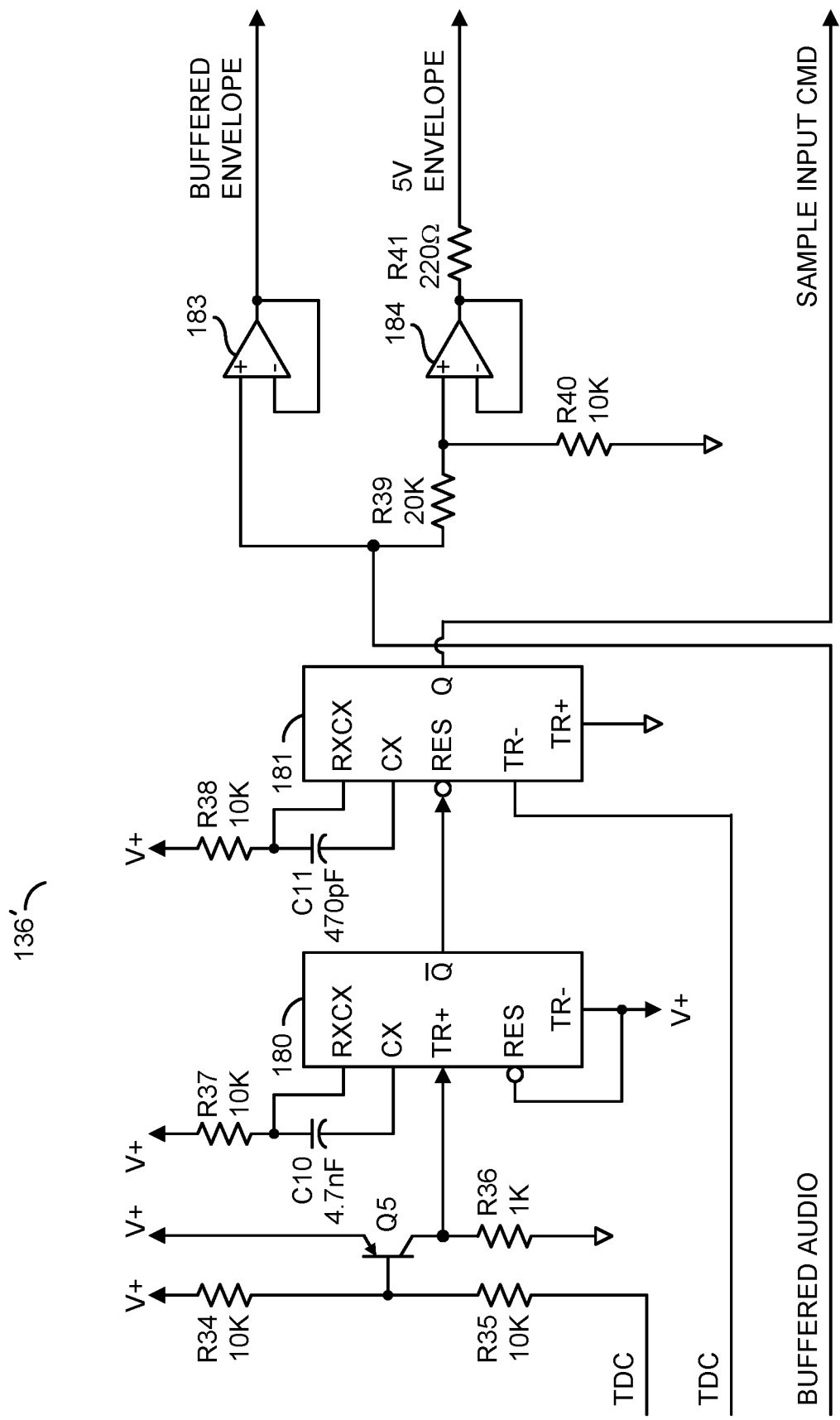
FIG. 13 is a diagram illustrating another example implementation of the envelope detection circuit of the audio-based situation awareness for vehicles system of FIG. 4.

Referring to FIG. 13, a diagram is shown illustrating another example implementation of the envelope detection circuit 136 of the analog audio processing module 110i of FIG. 4. In some embodiments, an envelope detection circuit 136' may be implemented, to significantly reduce cost. In an example, the envelope detection circuit 136' may be implemented similarly to the envelope detection circuit 136 except that the sample and hold circuit 182 may be omitted. In an example, the true (Q) output terminal of the circuit 181 may be presented to the processor 114 (e.g., via the interface 112) as a sample input command signal (e.g., SAMPLE INPUT CMD). The processor 114 may use the signal SAMPLE INPUT CMD to input raw audio data (e.g., via the signals BUFFERED ENVELOPE and 5V ENVELOPE) into an analog-to-digital convertor of the processor 114.

Figure 14:
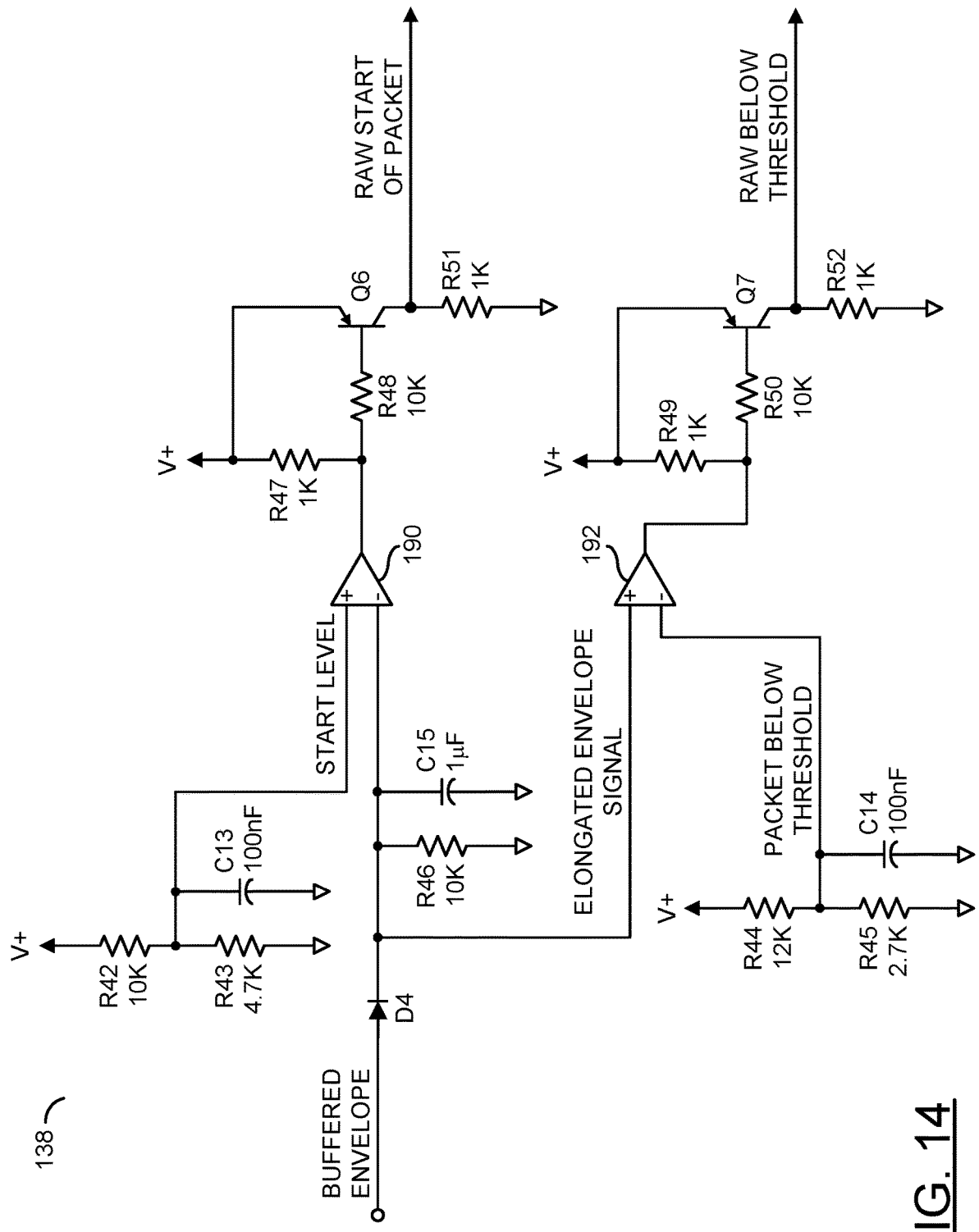
FIG. 14 is a diagram illustrating an example implementation of a start and end of packet detection circuit of the audio-based situation awareness for vehicles system of FIG. 4.

Referring to FIG. 14, a diagram is shown illustrating an example implementation of a start and end of packet detection circuit 138 of the analog audio processing module 110i of FIG. 4. In an example, the start and end of packet detection circuit 138 is generally configured to apply two predetermined threshold levels to the signal BUFFERED ENVELOPE to determine when an audio packet begins (or starts) and ends. In an example, when a level of the signal BUFFERED ENVELOPE is greater than or equal to a first threshold (e.g., START LEVEL), the signal RAW START OF PACKET may be asserted. In an example, when a level of the signal BUFFERED ENVELOPE is lower than or equal to a second threshold (e.g., PACKET BELOW THRESHOLD), the signal PACKET BELOW THRESHOLD may be asserted.

In an example, the start and end of packet detection 138 may comprise a block (or circuit) 190, a block or (circuit) 192, a sixth transistor Q6, a seventh transistor Q7, a number of resistors R42-R52, a number of capacitors C13-C15, and a diode D4. In an example, the circuits 190 and 192 may be implemented as operation amplifiers. In an example, the transistor Q6 may comprise a pnp bipolar transistor. In an example, the transistor Q7 may comprise an npn bipolar transistor.

A first terminal of the resistor R42 may be connected to the positive supply voltage V+. A second terminal of the resistor R42 may be connected to a first terminal of the resistor R43, a first terminal of the capacitor C13, and a first input terminal of the circuit 190. A second terminal of the resistor R43 and a second terminal of the capacitor C13 may be connected to the circuit ground potential. A first terminal of the resistor R44 may be connected to the positive supply voltage V+. A second terminal of the resistor R44 may be connected to a first terminal of the resistor R45, a first terminal of the capacitor C14, and a first input terminal of the circuit 192. A second terminal of the resistor R45 and a second terminal of the capacitor C14 may be connected to the circuit ground potential.

The signal BUFFERED ENVELOPE may be presented to an anode terminal of the diode D4. A cathode terminal of the diode D4 may be connected to a first terminal of the resistor R46, a first terminal of the capacitor C15, a second input terminal of the circuit 190, and a second input terminal of the circuit 192. A second terminal of the resistor R46 and a second terminal of the capacitor C15 may be connected to the circuit ground potential. An output terminal of the circuit 190 may be connected to a first terminal of the resistor R47 and a first terminal of the resistor R48. An output terminal of the circuit 192 may be connected to a first terminal of the resistor R49 and a first terminal of the resistor R50. A second terminal of the resistor R47 and an emitter terminal of the transistor Q6 may be connected to the positive supply voltage V+. A second terminal of the resistor R49 and an emitter terminal of the transistor Q7 may be connected to the positive supply voltage V+. A second terminal of the resistor R48 may be connected to a base terminal of the transistor Q6. A collector terminal of the transistor Q6 may be connected to a first terminal of the resistor R51. A second terminal of the resistor R51 may be connected to the circuit ground potential. The signal RAW START OF PACKET may be presented at a node formed by connection of the collector terminal of the transistor Q6 and the first terminal of the resistor R51. A second terminal of the resistor R50 may be connected to a base terminal of the transistor Q7. A collector terminal of the transistor Q7 may be connected to a first terminal of the resistor R52. A second terminal of the resistor R52 may be connected to the circuit ground potential. The signal RAW BELOW THRESHOLD may be presented at a node formed by connection of the collector terminal of the transistor Q7 and the first terminal of the resistor R52.

Figure 15:
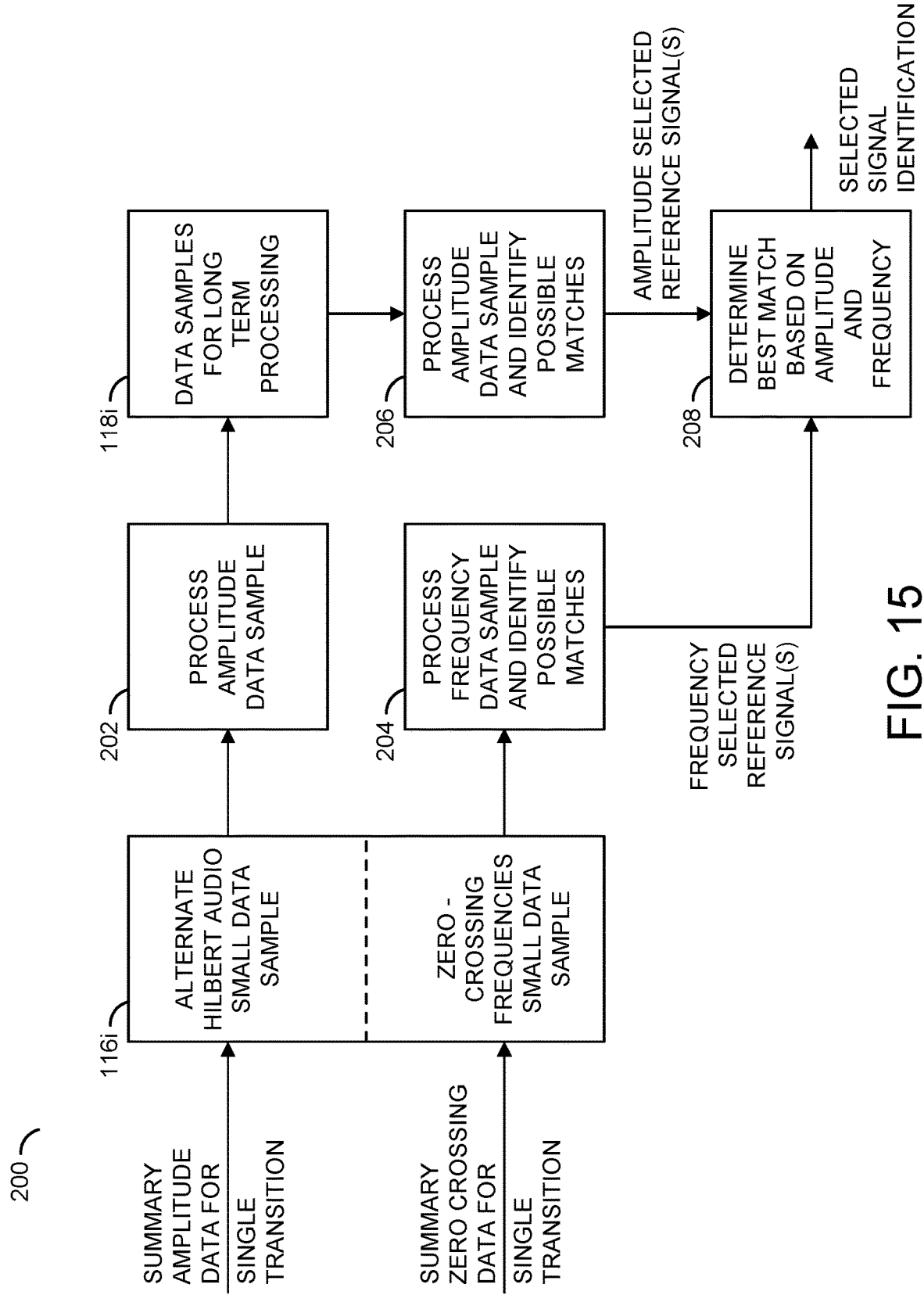
FIG. 15 is a diagram illustrating an audio sample stacking process in accordance with an embodiment of the invention.

Referring to FIG. 15, a diagram is shown illustrating an audio sample stacking process in accordance with an embodiment of the invention. In an example, the audio sensors 102a-102n receive the analog audio data from the environment around the vehicle 50. The analog audio processing modules 110a-110n process signals from the audio sensors 102a-102n to produce audio sample data that is communicated to the processor 114. In an example, the processor 114 may execute a process (or method) 200 to perform signal identification in accordance with an embodiment of the invention. In an example, the process 200 may utilize audio data samples stored in the ST-FIFOs 116 and the LT-FIFOs 118.

In an example, the process 200 may comprise a step (or state) 202, a step (or state) 204, a step (or state) 206, and a step (or state) 208. In an example, the analog data collected by the sensors 102a-102n may be presented to the respective analog processing paths 110a-110n that generate audio data representing the analog data. The audio data from each of the analog processing paths 110a-110n may be stacked concurrently in the set of respective short term first-in-first-out memories (ST_FIFOs) 116a-116n. In an example, the ST-FIFOs 116a-116n may be configured to hold 100 milliseconds of the audio data.

In various embodiments, the ST-FIFOs 116a-116n comprise a first portion and a second portion. The first portion may store alternate Hilbert transform audio small data samples corresponding to a single transition of the respective audio signals AUDIO_1-AUDIO_N. The second portion may store zero-crossing frequencies small data samples corresponding to the single transition of the respective audio signals AUDIO_1-AUDIO_N. In an example, the alternative Hilbert transform small data may include, but is not limited to, mean, standard deviation, peak amplitude, start of signal, frequencies of the alternative Hilbert transform, time stamp and amplitude of the sampled audio amplitude, etc. In an example, the alternative Hilbert transform small data may also include identification and timing of null periods (e.g., insufficient amplitude). In an example, the zero-crossing frequencies small data may include, but is not limited to, carrier frequency histogram data, mean and standard deviation of the frequency, transient event time and polarity, etc. In an example, characterizations of signals utilizing frequency processing from zero cross over analysis may comprise the following operations: calculating the carrier frequencies; establishing the most recent characteristics; establishing histograms for pattern recognition; identifying pitch signals composed of multiple frequency sine waves; and verifying consistent samplings.

Once every 100 milliseconds, the data in the ST-FIFOs 116a-116n may be further processed. In the step 202, the processed audio amplitude data from each of the ST-FIFOs 116a-116n is processed then transferred to the respective LT-FIFOs 118a-118n that may be configured to hold the last five seconds of processed audio data. The processed audio data in the LT-FIFOs 118a-118n is generally processed to produce statistics regarding the audio data. In the step 204, the processed zero-crossing frequency data in the ST-FIFOs 116a-116n may be processed and evaluated to determine an identification based on frequency patterns of a possible audio source or sources from a set of reference sounds. In the step 206, the processed amplitude data in the LT-FIFOs 118a-118n may be processed and evaluated to determine an identification based on amplitude of a possible audio source or sources from the set of reference sounds. In the step 208, the process 200 may determine a best match with the possible audio sources selected in the steps 204 and 206. In an example, the step 208 may select the best matching signal identification based on the alternative Hilbert transformation data, the zero-crossing frequency information, and packet start and stop information. In an example, the step 208 may utilize a processing mechanism that includes, but is not limited to, decision trees, artificial neural networks, random forest techniques, machine learning techniques, and other artificial intelligence techniques. Machine learning techniques may be used to reduce maintenance effort and/or cost.

In an example embodiment, a zero-crossover circuit is used to measure the time differences between transitions to negative values, the time differences between transitions to positive values, and the time differences between transitions to positive values and transitions to negative values. The time between transitions is used to calculate the frequency of an equivalent sine wave. The resulting frequencies are stored in the LT-FIFOs 118a-118n for up to five seconds. In an example, the frequency data queued in the LT-FIFOs 118a-118n is compared with known recorded signatures. A rating of the closeness to the known signatures is then used to identify the characterization of the signal received by the sensors 102a-102n.

In various embodiments, the zero-crossover data is used to establish the frequencies contained in the analog audio signals. In an example, the frequencies may be computed by the Equation 2:

$$\text{Frequency} = 1/(2*(tk-tk+1)), \quad \text{EQ.2}$$

where tk is the time of the first zero-crossover transition and tk+1 is the time of the following zero-crossover transition. In an example, the accumulation of these frequency values over a frequency sampling period may be used as the signature of the audio signal and may be compared with signatures from known sources to identify the classification (or type characteristic) of the signal.

To examine the frequencies of the signal, the signals for a sampling period duration are summarized by calculating the frequency. The frequencies for the last sampling period are classified by frequency range. The most significant characteristics are used to identify possible matches. Multiple sampling segments may be checked to verify consistent results. In an example, the "Random Forest" machine learning technique may be utilized. In an example, utilizing the machine learning technique eliminates the need to perform Fast Fourier Transformations (FFTs), which reduces the processing requirements and associated costs.

Figure 16:
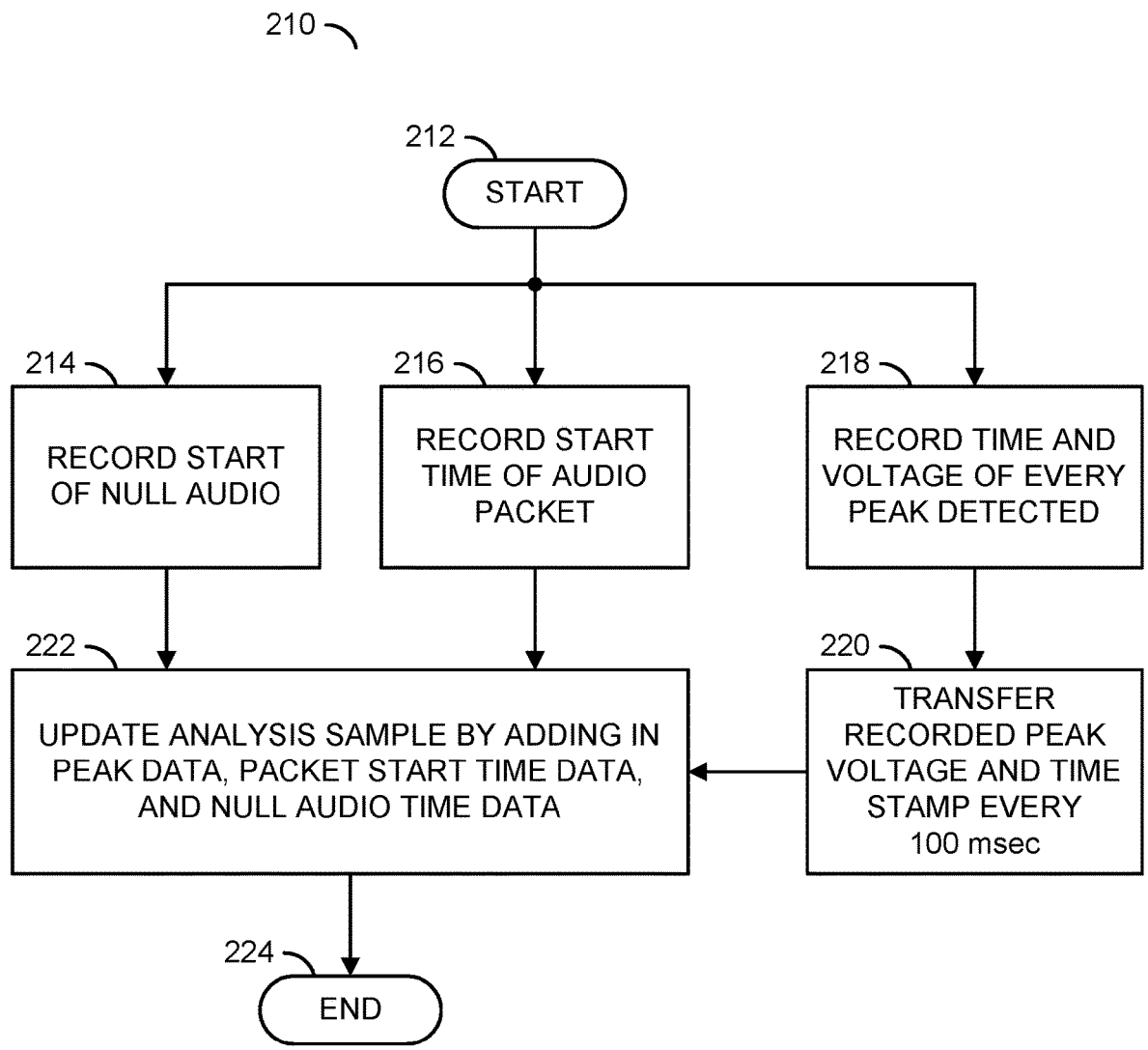
FIG. 16 is a diagram illustrating the audio sample stacking process for the audio signal and their associated processing.

Referring to FIG. 16, a diagram is shown illustrating a more detailed example of an audio sample stacking process for the audio input signals and the associated processing. In an example, a process (or method) 210 may be implemented to perform audio sample stacking in accordance with an embodiment of the invention. In an example, the analog data samples from each of the analog processing paths 110a-110n may be stacked concurrently in the set of respective short term first-in-first-out memories (ST FIFOs) 116a-116n. In an example, the ST-FIFOs 116a-116n may be configured to hold 100 milliseconds of the audio data.

In an example, the process 210 may comprise a step (or state) 212, a step (or state) 214, a step (or state) 216, a step (or state) 218, a step (or state) 220, a step (or state) 222, and a step (or state) 224. The process 210 may start in the step 212 and move to the steps 214, 216, and 218. The steps 214, 216, and 218 may be performed concurrently. In the step 214, the process 210 may record a start of a null audio period. In an example, the start of the null audio period may be determined based on the signal RAW BELOW THRESHOLD. In the step 216, the process 210 may record a start time of an audio packet. In an example, the start of the audio packet may be determined based on the signal RAW START OF PACKET. In the step 218, the process 210 may record the time and voltage level of each peak detected. In an example, the time of each peak may be determined based on the signal TDC. In the step 220, the process 210 may transfer the time and voltage level of each peak recorded in the step 218 to respective ST-FIFOs 116a-116n each minimum observation period (e.g., every 100 milliseconds). In the step 222, the process 210 may update an analysis sample by adding in the peak data (e.g., time and voltage level) transferred in the step 220, the packet start time data from the step 216, and the null audio time data from the step 214. The process 210 may terminate in the step 224.

Figure 17:
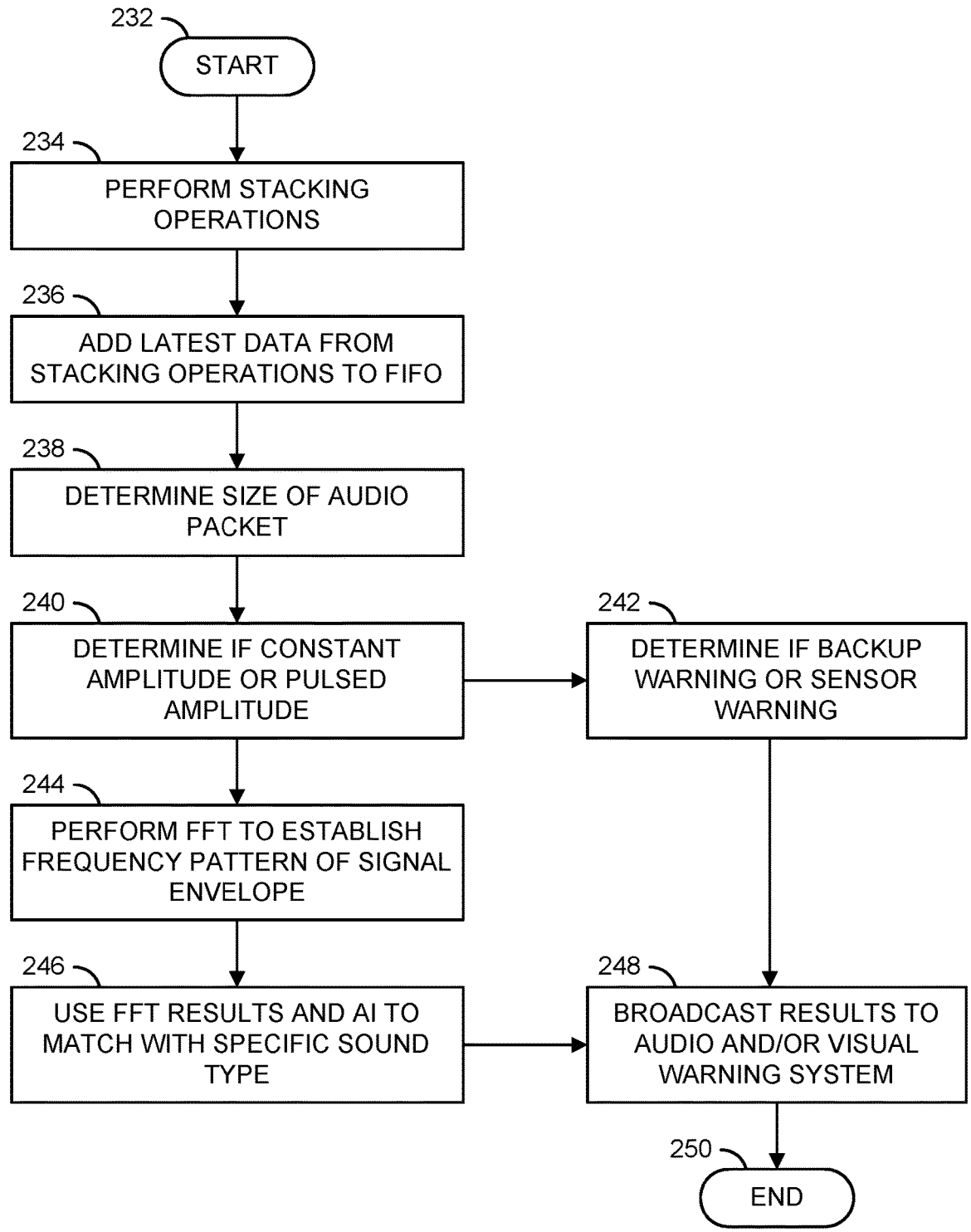
FIG. 17 is a diagram illustrating utilizing the audio sample stacking process for the audio signal for audio identification processing.

Referring to FIG. 17, a diagram is shown illustrating a process 230 utilizing the audio sample stacking process for the audio signal for audio identification processing in accordance with an embodiment of the invention. In an example, the process 230 may comprise a step (or state) 232, a step (or state) 234, a step (or state) 236, a step (or state) 238, a step (or state) 240, a step (or state) 242, a step (or state) 244, a step (or state) 246, and a step (or state) 248. The process 230 may start in the step 232 and move to the step 234. In the step 234, the process 230 may perform stacking operations. In an example, the stacking operations may be perform using the process 210 described above in connection with FIG. 16. In the step 236, the process 230 may add the latest recorded data from the stacking operations to respective ones of the LT-FIFOs 118a-118n. In the step 238, the process 230 may determine a size of the audio packet being analyzed. In an example, the size of the audio packet may be determined based on the start time of packet data and the start of null audio data obtained in the step 234. In the step 240, the process 230 may determine whether the audio signal has a constant amplitude or a pulsed amplitude.

In the step 242, the process 230 may determine whether the audio signal is a backup warning or a sensor warning. In the step 244, the process 230 may perform a Fast Fourier Transform (FFT) on the data to establish a frequency pattern of the signal envelope. In the step 246, the process 230 may use the results of the FFT and artificial intelligence (AI) and/or machine learning techniques to determine a best match between specific (or known) sound types and the audio samples. In an example, the techniques may include, but are not limited to, Decision Trees, Random Forrest, and Naive Bayes Algorithm. In an example, additional Machine Learning and Deep Learning techniques may be applied to provide performance improvements or as the number of identified sounds increases.

Figure 18:
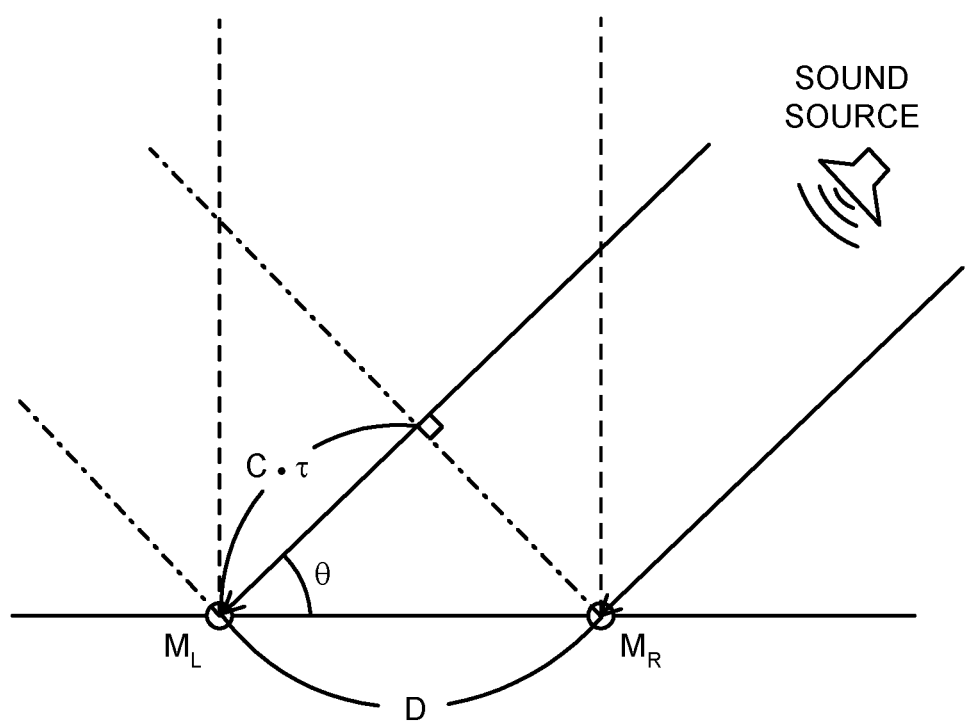
FIG. 18 is a diagram illustrating a Time Difference of Arrival process.

Referring to FIG. 18, a diagram is shown illustrating a Time Difference of Arrival (TDOA) process. In an example, the source of raw audio may be calculated (located) by a technique called Time Difference of Arrival (TDOA). In an example, two of the sensors 102a-102n (e.g., microphones $M_L$ and $M_R$) with the highest signal amplitude may be used for determining the start of an audio packet. The distance (e.g., D) between the two microphones $M_L$ and $M_R$ is generally fixed (e.g., by the placement on the vehicle 50) and, therefore, is known. The angle to the source (e.g., Theta) of the audio may be calculated using the following Equation 3:

$$\text{Theta} = \text{inverse\_cosine\_of}((C*Tau)/D), \qquad \text{EQ.3}$$

where "Tau" is the time difference between the two signals received by the two microphones $M_L$ and $M_R$, and C is the speed of sound. Because the delay is the same for sounds coming from the front and the back (or from the right and the left) of the vehicle, additional calculation using at least three sensors is needed to determine the direction from which the sound is coming.

The terms "may" and "generally" when used herein in conjunction with "is (are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"–"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"–"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

The functions illustrated by the diagrams of FIGS. 1-18 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

Embodiments of the invention may also be implemented by the preparation of ASICS (application specific integrated circuits), Platform ASICS, FPGAS (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

While the invention has been particularly shown and described with reference to embodiments thereof, it will be understood by those skilled in the art that various changes in form and details may be made without departing from the scope of the invention.

The invention claimed is:

1. An apparatus comprising:
   at least three audio sensors configured to generate electronic signals in response to audio sounds in an environment surrounding a vehicle;
   at least three analog audio processing modules configured to generate processed audio signals by processing the electronic signals generated by the at least three audio sensors, wherein amplitude and pitch of the electronic signals are processed using separate analog processing paths; and
   a processor circuit configured to process the processed audio signals generated by the at least three analog audio processing modules to determine a source direction of the audio sounds relative to the vehicle and identify a type characteristic of the audio sounds, wherein each of the at least three analog processing modules comprises
      a buffer circuit configured to generate a buffered version of the electronic signals received from a respective one of the at least three audio sensors,
      a peak detection circuit configured to generate a first intermediate signal and a second intermediate signal in response to the buffered version of the electronic signals received from the respective one of the at least three audio sensors, and
      an envelope detection circuit configured to generate (i) a digital sample and hold control signal, (ii) an analog envelope signal comprising a sample of an envelope of the respective one of the electronic signals received from the at least three audio sensors taken in response to the digital sample and hold control signal, and (iii) a buffered version of the analog envelope signal, based on the first intermediate signal, the second intermediate signal, and the buffered version of the electronic signals received from the respective one of the at least three audio sensors.

2. The apparatus according to claim 1, wherein the buffer circuit comprises an operational amplifier configured as a unity-gain amplifier.

3. The apparatus according to claim 1, wherein each of the at least three analog processing modules further comprises:
a zero-crossing detection circuit configured to generated a zero-crossover signal indicating detection of zero-crossings in the electronic signals received from the respective one of the at least three audio sensors.

4. The apparatus according to claim 1, wherein the envelope detection circuit performs an alternative Hilbert Transformation on the respective one of the electronic signals received from the at least three audio sensors.

5. The apparatus according to claim 1, wherein each of the at least three analog processing modules further comprises:
a start of packet detection circuit configured to generate a start of packet signal and an audio below threshold signal in response to the buffered version of the analog envelope 6 signal.

6. The apparatus according to claim 1, wherein each of the at least three audio sensors comprises:
a microphone configured to transform the audio sounds from the environment surrounding the vehicle to an electrical signal; and
an amplifier circuit configured to generate the respective one of the electronic signals in response to the electrical signal.

7. A method of implementing audio-based situation awareness in a vehicle comprising:
generating electronic signals in response to audio sounds in an environment surrounding a vehicle using at least three audio sensors;
generating processed audio signals by processing the electronic signals generated by the at least three audio sensors using at least three analog audio processing modules, wherein amplitude and pitch of said electronic signals are processed using separate analog processing paths; and
processing the processed audio signals to determine a source direction of the audio sounds relative to the vehicle and identify a type characteristic of the audio sounds, wherein processing the electronic signals generated by the at least three audio sensors comprises
generating a buffered version of the electronic signals received from the at least three audio sensors,
generating a zero-crossover signal indicating detection of zero-crossings in the electronic signals received from the at least three audio sensors,
generating a first intermediate signal and a second intermediate signal in response to the buffered version of the electronic signals received from the at least three audio sensors,
generating (i) a digital sample and hold control signal, (ii) an analog envelope signal comprising a sample of an envelope of the electronic signals received from the at least three audio sensors taken in response to the digital sample and hold control signal, and (iii) a buffered version of the analog envelope signal, and
generating a start of packet signal and an audio below threshold signal in response to the buffered version of the analog envelope signal.

8. The method according to claim 7, wherein generating the analog envelope signal comprises performing an alternative Hilbert Transformation on the electronic signals received from the at least three audio sensors.

9. The method according to claim 7, further comprising performing audio data stacking operations.

10. The method according to claim 9, wherein performing said audio data stacking operations comprises:
recording start times of null audio periods;
recording start times of audio packets;
recording times and amplitudes of peaks in the electronic signals received from the at least three audio sensors;
transferring recorded times and amplitudes of the peaks to respective first-in-first-out memories; and
updating an analysis sample by adding in times and amplitudes of the peaks, start times of the audio packets, and start times of the null audio periods.

11. The method according to claim 9, further comprising determining a size of the audio packets.

12. The method according to claim 11, further comprising determining whether the audio signals have a constant amplitude or a pulsed amplitude.

13. The method according to claim 11, further comprising establishing a frequency pattern of the analog envelope signal.

14. The method according to claim 13, further comprising using the frequency pattern of the analog envelope signal to determine whether the audio signals match a predetermined sound type.

15. The method according to claim 7, further comprising broadcasting at least one of an audio and a video warning based on the type characteristic of the audio sounds.

16. An apparatus comprising:
at least three audio sensors configured to generate electronic signals in response to audio sounds in an environment surrounding a vehicle;
at least three analog audio processing modules configured to generate processed audio signals by processing the electronic signals generated by the at least three audio sensors, wherein amplitude and pitch of the electronic signals are processed using separate analog processing paths; and
a processor circuit configured to process the processed audio signals generated by the at least three analog audio processing modules to determine a source direction of the audio sounds relative to the vehicle and identify a type characteristic of the audio sounds, wherein the processor circuit is further configured to (i) store audio amplitude data and zero-crossing data for a single transition from each of said at least three analog audio processing circuits in a first plurality of first-in-first-out (FIFO) memories for short term processing and (ii) store an accumulation of audio amplitude data from each of said at least three analog audio processing circuits in a second plurality of first-in-first-out (FIFO) memories for long term processing.

* * * * *